US010123101B2

(12) United States Patent
Ye et al.

(10) Patent No.: US 10,123,101 B2
(45) Date of Patent: Nov. 6, 2018

(54) COMMUNICATION METHOD APPLIED TO MULTI-WAVELENGTH PASSIVE OPTICAL NETWORK, APPARATUS, AND SYSTEM

(71) Applicant: Huawei Technologies Co., Ltd., Shenzhen (CN)

(72) Inventors: Zhicheng Ye, Wuhan (CN); Shengping Li, Wuhan (CN); Bo Gao, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/639,529

(22) Filed: Jun. 30, 2017

(65) Prior Publication Data
US 2017/0303020 A1 Oct. 19, 2017

Related U.S. Application Data

(63) Continuation of application No. PCT/CN2014/095651, filed on Dec. 30, 2014.

(51) Int. Cl.
*H04B 10/00* (2013.01)
*H04Q 11/00* (2006.01)
(Continued)

(52) U.S. Cl.
CPC ...... *H04Q 11/0067* (2013.01); *H04J 14/0212* (2013.01); *H04J 14/0223* (2013.01);
(Continued)

(58) Field of Classification Search
CPC .. H04J 14/0227; H04J 14/0228; H04J 14/023; H04J 14/0232; H04J 14/0234;
(Continued)

(56) References Cited

U.S. PATENT DOCUMENTS

2008/0267627 A1   10/2008   Effenberger
2011/0158638 A1    6/2011   Mie et al.
(Continued)

FOREIGN PATENT DOCUMENTS

CN    102045126 A    5/2011
CN    102369737 A    3/2012
(Continued)

OTHER PUBLICATIONS

"Series G: Transmission Systems and Media, Digital Systems and Networks; Digital sections and digital line system—Optical line systems for local and access networks; Phoneline networking transceivers—Isolation function," ITU-T Recommendation G.989.3, International Telecommunication Union, Geneva, Switzerland (Mar. 2003).

(Continued)

*Primary Examiner* — Daniel Dobson
(74) *Attorney, Agent, or Firm* — Leydig, Voit & Mayer, Ltd.

(57) ABSTRACT

Embodiments of the invention disclose a communication method which includes: receiving, by the optical network unit (ONU) by using the first port or the second port, a wavelength switching request message delivered by the optical line terminal (OLT), where the wavelength switching request message carries second wavelength channel information and port information that is of the second port; switching, by the ONU, an operating wavelength channel of an optical module connected to the second port from a first wavelength channel to a second wavelength channel corresponding to the second wavelength channel information; and sending, by the ONU, a wavelength switching complete message to the OLT by using the first port. According to the communication method provided in embodiments of the present invention, quick wavelength switching is performed (Continued)

based on the second port, so that a service is not interrupted in a wavelength switching process, and user experience is better.

21 Claims, 11 Drawing Sheets

(51) Int. Cl.
    *H04J 14/02*                   (2006.01)
    *H04J 14/00*                   (2006.01)
    *H04L 12/803*                (2013.01)

(52) U.S. Cl.
    CPC ...... *H04J 14/0242* (2013.01); *H04J 14/0294* (2013.01); *H04L 47/125* (2013.01); *H04Q 2011/0016* (2013.01); *H04Q 2011/0081* (2013.01); *H04Q 2011/0084* (2013.01)

(58) Field of Classification Search
    CPC ............... H04J 14/0235; H04J 14/0236; H04J 14/0238; H04J 14/0239; H04J 14/0241; H04J 14/0242; H04J 14/0245; H04J 14/0246; H04J 14/0247; H04J 14/0249; H04J 14/025; H04J 14/0252
    See application file for complete search history.

(56) References Cited

U.S. PATENT DOCUMENTS

| | | |
|---|---|---|
| 2012/0014693 A1 | 1/2012 | Cheng et al. |
| 2013/0315589 A1 | 11/2013 | Gao et al. |
| 2014/0178067 A1 | 6/2014 | Cheng |
| 2015/0023664 A1* | 1/2015 | Mukai ................. H04J 14/0242 398/58 |
| 2015/0215033 A1* | 7/2015 | Lin ........................ H04B 10/27 398/2 |

FOREIGN PATENT DOCUMENTS

| | | | |
|---|---|---|---|
| CN | 102820943 A | 12/2012 | |
| CN | 103391486 A | 11/2013 | |
| CN | 103548292 A | 1/2014 | |
| CN | 103731226 A | 4/2014 | |
| CN | 104137490 A | 11/2014 | |
| EP | 2451119 A1 | 5/2012 | |
| EP | 2525517 A1 | 11/2012 | |
| JP | 2001326654 A | 11/2001 | |
| JP | 2008028718 A | 2/2008 | |
| JP | 2008131088 A | 6/2008 | |
| JP | 2010034877 A | 2/2010 | |
| WO | 2010023721 A1 | 3/2010 | |
| WO | 2013157171 A1 | 10/2013 | |
| WO | 2013173983 A1 | 11/2013 | |

OTHER PUBLICATIONS

"Series G: Transmission Systems and Media, Digital Systems and Networks; Digital sections and digital line system—Optical line systems for local and access networks; 40-Gigabit-capable passive optical networks (NG-PON2): General requirements," Recommendation ITU-T G.989.1, International Telecommunications Union, Geneva, Switzerland (Mar. 2013).

"40-Gigabit-capable passive optical networks (NG-PON2): Transmission Convergence Layer," Draft new Recommendation ITU-T G.989.3, pp. 1-159, International Telecommunications Union, Geneva, Switzerland (Mar. 24-Apr. 4, 2014).

* cited by examiner

| ONU identifier 2 bytes | Message identifier 1 byte | Sequence number 1 byte | Data 36 bytes | Integrity check 8 bytes |
|---|---|---|---|---|

FIG. 5

COMMUNICATION METHOD APPLIED TO MULTI-WAVELENGTH PASSIVE OPTICAL NETWORK, APPARATUS, AND SYSTEM

CROSS-REFERENCE TO RELATED APPLICATIONS

This application is a continuation of International Application No. PCT/CN2014/095651, filed on Dec. 30, 2014, the disclosure of which is hereby incorporated by reference in its entirety.

TECHNICAL FIELD

Embodiments of the present invention relates to the field of communications, and in particular, to a communication method applied to a multi-wavelength passive optical network system, an apparatus, and a system.

BACKGROUND

A Passive Optical Network (PON) technology is a main broadband access technology at present. To resolve a problem that bandwidth is generally limited because a conventional Time Division Multiplexing (TDM) PON is affected by a TDM mechanism, the industry puts forward a Time Wave Division Multiplexing (TWDM) PON system combining a wavelength division multiplexing (WDM) technology and a TDM technology.

The TWDM PON system is a point-to-multipoint communications system. Data transceiving between an Optical line terminal (OLT) at a central office and an Optical Network Unit, (ONU)/Optical Network Terminal (ONT) at premises of a user is performed by using multiple wavelength channels. Each ONU works on one of the wavelength channels. An ONU may indicate an ONU and/or an ONT. In a downstream direction, the OLT uses a downstream wavelength corresponding to each wavelength channel to broadcast downstream data to multiple ONUs that work on the wavelength channel. In an upstream direction, an ONU on each wavelength channel may use an upstream wavelength of the wavelength channel to send upstream data to the OLT in a timeslot allocated by the OLT.

In practical application, to implement a load balance among wavelength channels in the TWDM PON system, a downstream wavelength and an upstream wavelength that are used by an ONU may be dynamically adjusted. When the OLT finds that a wavelength channel is overloaded, the OLT may send a wavelength switching instruction to an ONU that works on the wavelength channel, to instruct the ONU to switch to a wavelength channel with relatively light load by adjusting an upstream wavelength and/or a downstream wavelength of the ONU.

In the current TWDM PON system, in a wavelength switching process of an ONU, the OLT needs to first send a wavelength switching instruction to the ONU, and the ONU performs wavelength switching after receiving the wavelength switching instruction. In a process of waiting for the ONU to complete the wavelength switching, the OLT continuously sends, to the ONU, a query command about whether switching is completed. After completing the wavelength switching, the ONU sends, to the OLT, a message indicating that the wavelength switching is completed. After receiving the message indicating that the wavelength switching is completed sent by the ONU, the OLT starts to send information such as timeslot authorization of downstream data and upstream data to the ONU, and then the OLT and the ONU can restore normal service communication.

In the existing TWDM PON system, in a wavelength switching process, a time for wavelength switching of the ONU is relatively long, and repeated information interaction and confirmation are needed to restore normal data communication between the OLT and the ONU. Therefore, wavelength switching results in a relatively long service interruption time, and consequently user experience for a real-time transmission service such as voice or video may be reduced. In addition, when there is traffic congestion or a large amount of burst data traffic, a data packet loss may occur and service quality may be affected.

SUMMARY

Embodiments of the invention provide a communication method applied to a multi-wavelength passive optical network system, an optical network terminal, an optical line terminal, and a passive optical network system to resolve a technical problem of a relatively long service interruption time due to wavelength switching in the prior art.

To achieve the foregoing objective, the following technical solutions are used in the embodiments of the present invention:

According to a first aspect, a communication method applied to a multi-wavelength passive optical network system is provided. The multi-wavelength PON includes an optical line terminal OLT and at least one optical network unit ONU, and the ONU includes at least a first port and a second port, and the method includes: receiving, by the ONU by using the first port or the second port, a wavelength switching request message delivered by the OLT, where the wavelength switching request message carries second wavelength channel information and port information that is of the second port; switching, by the ONU, an operating wavelength channel of an optical module connected to the second port from a first wavelength channel to a second wavelength channel; and sending, by the ONU, a wavelength switching complete message to the OLT by using the first port.

With reference to the first aspect, in a first possible implementation manner of the first aspect, the method further includes: in a process in which the ONU switches the operating wavelength channel of the optical module connected to the second port from the first wavelength channel to the second wavelength channel, sending, by the ONU, current state information of the ONU to the OLT by using the first port.

With reference to the first aspect or the first possible implementation manner of the first aspect, in a second possible implementation manner of the first aspect, the method further includes: receiving, by the ONU by using the second port, a wavelength confirmation instruction sent by the OLT; and sending, by the ONU, a wavelength confirmation response message on the second wavelength channel by using the second port.

With reference to the first aspect or any possible implementation manner of the first aspect, in a third possible implementation manner of the first aspect, the ONU receives, by using the first port or the second port, a service handover message sent by the OLT, where the service handover message is used to instruct the ONU to switch a service packet receiving port from the first port to the second port, and the service handover message carries second port information.

With reference to the third possible implementation manner of the first aspect, in a fourth possible implementation manner of the first aspect, the method further includes: sending, by the ONU, a service handover confirmation message to the OLT by using the first port; disabling, by the ONU, a laser corresponding to the first port; enabling, by the ONU, a laser corresponding to the second port; and performing, by the ONU, service packet interaction with the OLT at the second wavelength by using the second port.

With reference to the first aspect or any possible implementation manner of the first aspect, in a fifth possible implementation manner of the first aspect, the ONU receives, by using the first port, a second wavelength switching request message delivered by the OLT, and the second wavelength switching request message is used to instruct to switch an operating wavelength of an optical module connected to the first port of the ONU from a first wavelength to a second wavelength, and the second wavelength switching request message carries the second wavelength information. The ONU sends a second wavelength switching confirmation message to the OLT at the second wavelength by using the second port. The ONU switches the operating wavelength of the optical module connected to the first port from the first wavelength to the second wavelength. The ONU sends a second wavelength switching complete message to the OLT at the second wavelength by using the second port.

With reference to the first aspect or any possible implementation manner of the first aspect, in a sixth possible implementation manner of the first aspect, the ONU receives, at the second wavelength by using the second port, a service offloading request message delivered by the OLT; or the ONU receives, on the first wavelength channel by using the first port, a service offloading request message delivered by the OLT, where the service offloading request message is used to instruct the ONU to enable the optical module corresponding to the second port to work normally.

With reference to the sixth possible implementation manner of the first aspect, in a seventh possible implementation manner of the first aspect, the method further includes: sending, by the ONU, a service offloading confirmation message to the OLT on the first wavelength channel by using the first port; enabling, by the ONU, a laser corresponding to the second port; and performing, by the ONU, service packet interaction with the OLT by using the first port and the second port.

With reference to the first aspect or any possible implementation manner of the first aspect, in an eighth possible implementation manner of the first aspect, the wavelength switching request message carries a start time at which the second port performs wavelength switching.

With reference to the first aspect or any possible implementation manner of the first aspect, in a ninth possible implementation manner of the first aspect, the second wavelength channel is an upstream wavelength and/or a downstream wavelength.

With reference to the first aspect or any possible implementation manner of the first aspect, in a tenth possible implementation manner of the first aspect, the first wavelength channel is an upstream wavelength and/or a downstream wavelength.

According to a second aspect, a communication method applied to a multi-wavelength passive optical network is provided. The multi-wavelength PON includes an optical line terminal OLT and at least one optical network unit ONU, and the ONU includes a first port and a second port, and the method includes: sending, by the OLT, a wavelength switching request message to the ONU, where the wavelength switching request message carries second wavelength information and port information that is of the second port; and receiving, by the OLT, a wavelength switching complete message sent from the first port of the ONU With reference to the second aspect, in a first possible implementation manner of the second aspect, the OLT sends, on a first wavelength channel, a wavelength switching confirmation message to the first port of the ONU.

With reference to the second aspect or the first possible implementation manner of the second aspect, in a second possible implementation manner of the second aspect, the OLT receives, on the first wavelength channel, current state information of the ONU from the first port of the ONU.

With reference to the second aspect or any possible implementation manner of the second aspect, in a third possible implementation manner of the second aspect, the OLT sends, to the second port of the ONU, a grant message of an upstream light-emitting timeslot that is allocated for the second port, and the OLT receives, at a second wavelength, upstream light sent by the second port of the ONU.

With reference to the second aspect or any possible implementation manner of the second aspect, in a fourth possible implementation manner of the second aspect, the OLT sends a service handover message to the first port of the ONU, where the service handover message is used to instruct the ONU to change the first service packet receiving port to the second port, and the service handover message carries second port information.

With reference to the fourth possible implementation manner of the second aspect, in a fifth possible implementation manner of the second aspect, the OLT receives a service handover confirmation message sent from the first port of the ONU, and the OLT sends a service packet to the second port of the ONU by using a second wavelength channel.

With reference to the second aspect or any possible implementation manner of the second aspect, in a sixth possible implementation manner of the second aspect, the OLT sends a second wavelength switching request message to the first port of the ONU, and the second wavelength switching request message is used to instruct the first port of the ONU to switch an operating wavelength from a first wavelength to a second wavelength, and the second wavelength switching request message carries the second wavelength information. The OLT receives, at the second wavelength, a second wavelength switching confirmation message sent from the first port of the ONU. The OLT receives, at the second wavelength, a wavelength switching complete message sent from the second port of the ONU.

With reference to the second aspect or any possible implementation manner of the second aspect, in a seventh possible implementation manner of the second aspect, the OLT sends a service offloading request message to the second port of the ONU by using the second wavelength channel, or sends a service offloading request message to the first port of the ONU by using the first wavelength channel, where the service offloading request message is used to instruct the ONU to enable an optical module corresponding to the second port to work normally.

With reference to the seventh possible implementation manner of the second aspect, in an eighth possible implementation manner of the second aspect, the OLT receives, by using the first wavelength channel, a service offloading confirmation message sent from the first port of the ONU; and the OLT receives a message from the first port and the second port of the ONU by using the first wavelength channel and the second wavelength channel respectively.

With reference to the second aspect or any possible implementation manner of the second aspect, in a ninth possible implementation manner of the second aspect, the wavelength switching request message carries a start time t0 at which the second port performs wavelength switching.

With reference to the second aspect or any possible implementation manner of the second aspect, in a tenth possible implementation manner of the second aspect, the second wavelength channel is an upstream wavelength and/or a downstream wavelength.

With reference to the second aspect or any possible implementation manner of the second aspect, in an eleventh possible implementation manner of the second aspect, the first wavelength channel is an upstream wavelength and/or a downstream wavelength.

According to a third aspect, an optical network unit ONU is provided. The ONU includes at least a first port and a second port, and the ONU includes: the first port, configured to receive a service packet from an OLT, or configured to receive a wavelength switching request message delivered by an OLT, where the wavelength switching request message carries second wavelength channel information and port information that is of the second port, and send the wavelength switching request message to a processor; the second port, configured to: when the first receiver is configured to receive the service packet from the OLT, receive the wavelength switching request message delivered by the OLT, where the wavelength switching request message carries the second wavelength information and the port information that is of the second port; or when the first receiver is configured to receive the wavelength switching request message delivered by the OLT, and the wavelength switching request message carries the second wavelength channel information and the port information that is of the second port, configured to perform a redundancy backup of the ONU; and the processor connected to the first port and the second port, configured to switch an operating wavelength of an optical module corresponding to the second port of the ONU from a first wavelength channel to a second wavelength channel corresponding to the second wavelength channel information; and generate a wavelength switching complete message and transmit the wavelength switching complete message to the first port. The first port is further configured to send the wavelength switching complete message to the OLT.

With reference to the third aspect, in a first possible implementation manner of the third aspect, the first port of the ONU is further configured to: when the second port of the ONU performs wavelength switching, feed back a current state of the ONU by using the first wavelength channel.

With reference to the third aspect or the first possible implementation manner of the third aspect, in a second possible implementation manner of the third aspect, the second port of the ONU is further configured to receive a wavelength confirmation instruction from the OLT by using the second wavelength channel.

With reference to the second possible implementation manner of the third aspect, in a third possible implementation manner of the third aspect, the second port of the ONU is further configured to: after receiving the wavelength confirmation instruction, feed back a confirmation response message by using a target wavelength channel.

With reference to the second or the third possible implementation manner of the third aspect, in a fourth possible implementation manner of the third aspect, the second port of the ONU is further configured to receive a wavelength switching success instruction from the OLT by using the second wavelength channel.

With reference to the third aspect or any possible implementation manner of the third aspect, in a fifth possible implementation manner of the third aspect, the first port of the ONU is further configured to receive a service handover instruction from the OLT, where the service handover instruction is used to instruct to change a service packet receiving port of the ONU from the first port to the second port, and the service handover instruction carries second port information of the ONU.

With reference to the third aspect or any possible implementation manner of the third aspect, in a sixth possible implementation manner of the third aspect, the first port of the ONU is further configured to feed back a service handover confirmation message to the OLT.

With reference to the third aspect or any possible implementation manner of the third aspect, in a seventh possible implementation manner of the third aspect, the processor of the ONU is further configured to disable a first laser corresponding to the first port of the ONU and enable a second laser corresponding to the second port.

With reference to the third aspect or any possible implementation manner of the third aspect, in an eighth possible implementation manner of the third aspect, the first port of the ONU is further configured to receive a second wavelength switching request message from the OLT, and the second wavelength switching request message is used to instruct a laser or a receiver corresponding to the first port of the ONU to switch from the first wavelength channel to the second wavelength channel, and the second wavelength switching request message carries port information of the first port and the second wavelength channel information.

With reference to the third aspect or any possible implementation manner of the third aspect, in a ninth possible implementation manner of the third aspect, the processor of the ONU is further configured to control the laser or the receiver corresponding to the first port to be adjusted from the first wavelength channel to the second wavelength channel.

With reference to the third aspect or any possible implementation manner of the third aspect, in a tenth possible implementation manner of the third aspect, the second port of the ONU is further configured to receive an upstream timeslot grant message from the OLT by using a second downstream wavelength corresponding to the second wavelength channel.

With reference to the third aspect or any possible implementation manner of the third aspect, in an eleventh possible implementation manner of the third aspect, the first port of the ONU is further configured to receive a wavelength switching confirmation message from the OLT by using the second wavelength channel.

With reference to the third aspect or any possible implementation manner of the third aspect, in a twelfth possible implementation manner of the third aspect, the second wavelength channel includes an upstream wavelength and/or a downstream wavelength.

According to a fourth aspect, an optical line terminal OLT applied to a multi-wavelength passive optical network is provided. The multi-wavelength PON includes the OLT and at least one optical network unit ONU, and the ONU includes a first port and a second port, and the OLT includes: a sending module, configured to send a wavelength switching request message to the ONU, where the wavelength switching request message carries second wavelength information and port information that is of the second port, and the wavelength switching request message is used to identify a switch of an operating wavelength of an optical module corresponding to the second port of the ONU from a first wavelength channel to a second wavelength channel; and a receiving module, configured to receive, on the first wavelength channel, a wavelength switching complete message sent from the first port of the ONU, where the wavelength switching complete message is used to identify that the optical module corresponding to the second port of the ONU completes wavelength switching.

With reference to the fourth aspect, in a first possible implementation manner of the fourth aspect, the receiving module is further configured to receive, on the first wavelength channel, current state information of the ONU that is sent from the first port of the ONU.

With reference to the fourth aspect or the first possible implementation manner of the fourth aspect, in a second possible implementation manner of the fourth aspect, the OLT further includes a processing module, and the processing module is configured to generate the wavelength switching request message and transmit the wavelength switching request message to the sending module.

With reference to the fourth aspect or any possible implementation manner of the fourth aspect, in a third possible implementation manner of the fourth aspect, the sending module is further configured to send a service handover message to the first port of the ONU, where the service handover message is used to instruct the ONU to change the first service packet receiving port to the second port, and the service handover message carries second port information.

With reference to the fourth aspect or any possible implementation manner of the fourth aspect, in a fourth possible implementation manner of the fourth aspect, the receiving module is further configured to receive a service handover confirmation message from the first port of the ONU, and the service handover confirmation message is used to identify whether the ONU performs service handover.

With reference to the fourth aspect or any possible implementation manner of the fourth aspect, in a fifth possible implementation manner of the fourth aspect, the sending module is further configured to send a service offloading request message to the first port of the ONU on the first wavelength channel or to the second port of the ONU on the second wavelength channel, where the service offloading request message is used to instruct the ONU to enable the optical module corresponding to the second port to work normally, and the service offloading request message carries port information of the second port.

With reference to the fourth aspect or any possible implementation manner of the fourth aspect, in a sixth possible implementation manner of the fourth aspect, the sending module is further configured to send a service offloading request message to the first port of the ONU on the first wavelength channel or to the second port of the ONU on the second wavelength channel, where the service offloading request message is used to instruct the ONU to enable the optical module corresponding to the second port to work normally, and the service offloading request message carries port information of the second port.

With reference to the fourth aspect or any possible implementation manner of the fourth aspect, in a seventh possible implementation manner of the fourth aspect, the wavelength switching request message carries a start time at which the second port performs wavelength switching.

With reference to the fourth aspect or any possible implementation manner of the fourth aspect, in an eighth possible implementation manner of the fourth aspect, the second wavelength channel is an upstream wavelength and/or a downstream wavelength.

With reference to the fourth aspect or any possible implementation manner of the fourth aspect, in a ninth possible implementation manner of the fourth aspect, the first wavelength channel is an upstream wavelength and/or a downstream wavelength.

According to a fifth aspect, a multi-wavelength PON system is provided. The multi-wavelength PON includes an optical line terminal OLT and at least one optical network unit ONU, where the ONU includes at least a first port and a second port, the first port and the second port work on a first wavelength, and the ONU includes the ONU according to any one of the third aspect.

According to the method provided in embodiments of the present invention, quick wavelength switching is performed based on the second port, so that a service is not interrupted in a process of the wavelength switching, and user experience is better.

BRIEF DESCRIPTION OF DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

FIG. 5 is a schematic diagram of a format of a PLOAM message frame according to an embodiment of the present invention;

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

Figure 1:
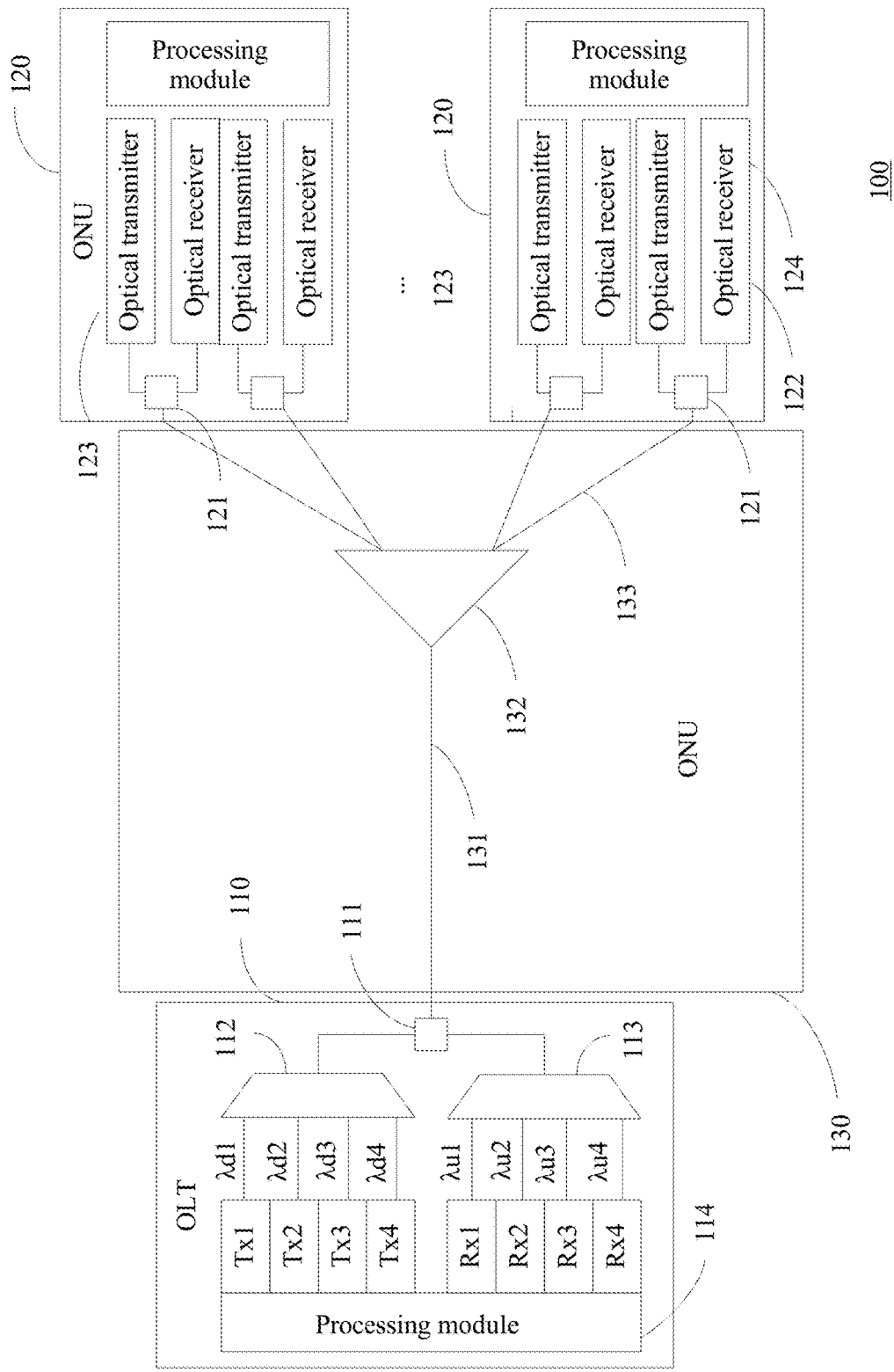
FIG. 1 is a schematic diagram of a multi-wavelength PON network architecture according to an embodiment of the present invention.
Figure 2:
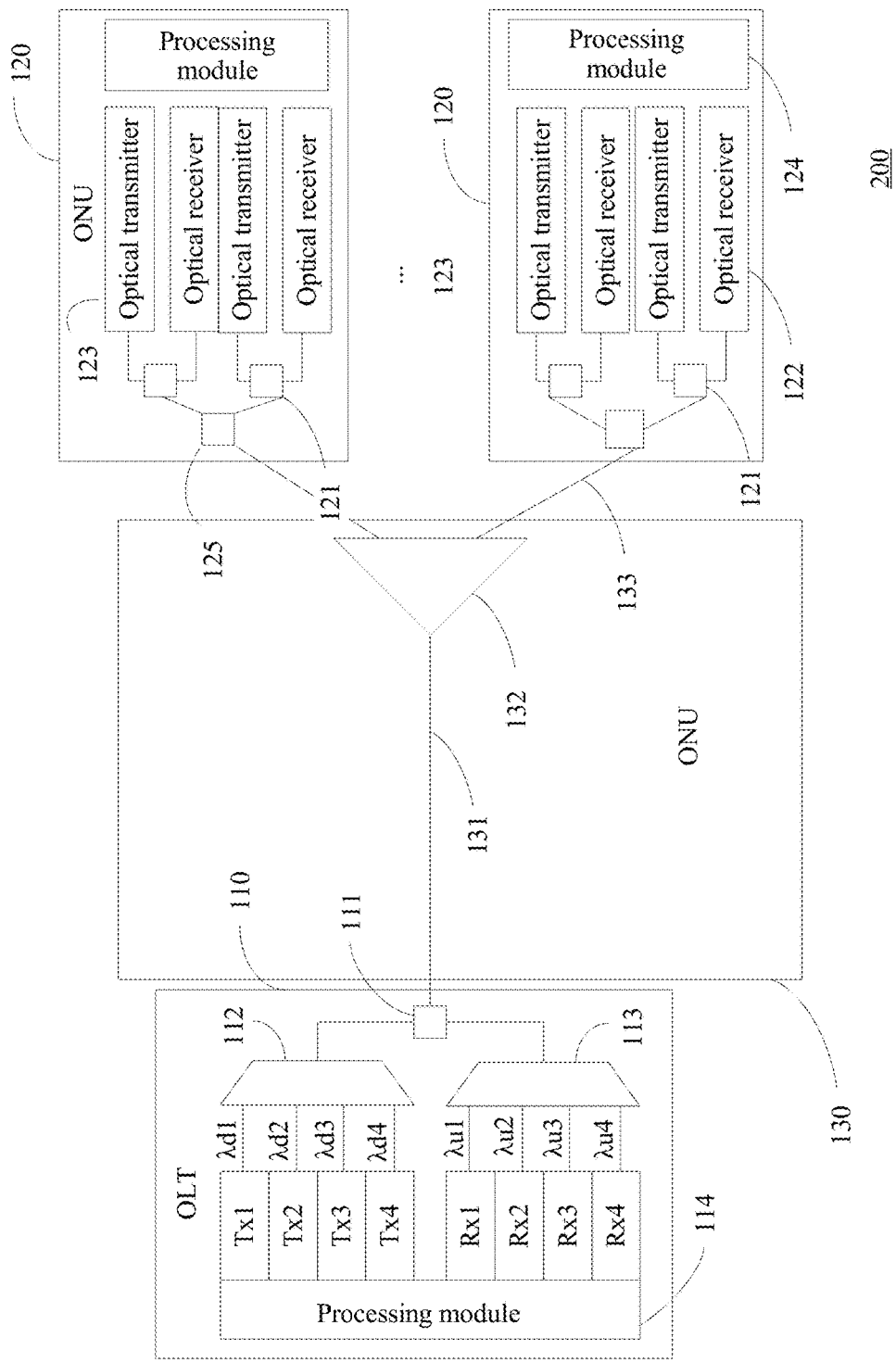
FIG. 2 is a schematic diagram of another multi-wavelength PON network architecture according to an embodiment of the present invention.

FIG. 1 and FIG. 2 show schematic diagrams of different application scenarios according to an embodiment of the present invention. For ease of description, an ONU/ONT mentioned in the following is referred to as an ONU. As shown in FIG. 1, in the multi-wavelength PON system, there is at least one ONU including at least two ports. For ease of description, the ONU is referred to as a multi-port ONU in the following. In FIG. 1, in an example in which the multi-port ONU includes two ports, an optical line terminal (OLT) is connected to multiple ONUs by using an optical distribution network (ODN). Each multi-port ONU occupies two distribution fibers, and the two distribution fibers are separately connected to the two ports of the ONU. In FIG. 2, in a same example in which the multi-port ONU includes two ports, each multi-port ONU occupies one distribution fiber by using a coupler 125.

Specifically, as shown in FIG. 1, the multi-wavelength PON system 100 includes an OLT 110, multiple ONUs 120, and an ODN 130. The OLT 110 is connected to the multiple ONUs 120 in a manner of point to multi-point (P2MP) by using the ODN 130. The multi-wavelength PON system 100 may further include more than one OLT. The multiple ONUs 120 share an optical transmission medium of the ODN 130. The ODN 130 may include a feeder fiber 131, an optical power splitter module 132, and multiple distribution fibers 133. The optical power splitter module 132 may be disposed on a remote node (RN). The optical power splitter module 132 is connected to the OLT 110 by using the feeder fiber 131, and is separately connected to the multiple ONUs 120 by using the multiple distribution fibers 133. In the multi-wavelength PON system 100, communication links between the OLT 110 and the multiple ONUs 120 may include multiple wavelength channels, and the multiple wavelength channels share the optical transmission medium of the ODN 130 in a WDM manner. Each ONU 120 may work on one wavelength channel in the multi-wavelength PON system 100, and each wavelength channel may carry a service of one or more ONUs 120. In addition, multiple ONUs 120 working on the same wavelength channel may share the wavelength channel in a TDM manner. In FIG. 1, that the multi-wavelength PON system 100 has four wavelength channels is used as an example for description. It should be understood that, in practical application, a quantity of wavelength channels in the multi-wavelength PON system 100 may be determined according to a network requirement.

For ease of description, in FIG. 1, the four wavelength channels in the multi-wavelength PON system 100 are separately named a wavelength channel 1, a wavelength channel 2, a wavelength channel 3, and a wavelength channel 4. Each wavelength channel uses a pair of upstream and downstream wavelengths. For example, an upstream wavelength and a downstream wavelength of the wavelength channel 1 may be respectively $\lambda u1$ and $\lambda d1$; an upstream wavelength and a downstream wavelength of the wavelength channel 2 may be respectively $\lambda u2$ and $\lambda d2$; an upstream wavelength and a downstream wavelength of the wavelength channel 3 may be respectively $\lambda u3$ and $\lambda d3$; and an upstream wavelength and a downstream wavelength of the wavelength channel 4 may be respectively $\lambda u4$ and $\lambda d4$. Each wavelength channel may have a corresponding wavelength channel identifier (for example, channel numbers of the four wavelength channels may be respectively 1, 2, 3, and 4), that is, there is a matching relationship between a wavelength channel identifier and upstream and downstream wavelengths of a wavelength channel that is identified by the wavelength channel identifier. The OLT 110 and the ONU 120 may learn an upstream wavelength and a downstream wavelength of a wavelength channel according to a wavelength channel identifier.

The OLT 110 may include an optical coupler 111, a first wavelength division multiplexer 112, a second wavelength division multiplexer 113, multiple downstream optical transmitters Tx1 to Tx4, multiple upstream optical receivers Rx1 to Rx 4, and a processing module 114. The multiple downstream optical transmitters Tx1 to Tx4 are connected to the optical coupler 111 by using the first wavelength division multiplexer 112; multiple upstream optical receivers Rx1 to Rx 4 are connected to the optical coupler 111 by using the second wavelength division multiplexer 113; and the coupler 111 is further connected to the feeder fiber 131 of the ODN 130.

Transmitter wavelengths of the multiple downstream optical transmitters Tx1 to Tx4 are different from each other. Each of the downstream optical transmitters Tx1 to Tx4 may be corresponding to a wavelength channel in the multi-wavelength PON system 100. For example, the transmitter wavelengths of the multiple downstream optical transmitters Tx1 to Tx4 may be respectively $\lambda d1$ to $\lambda d4$. The downstream optical transmitters Tx1 to Tx4 may respectively use the transmitter wavelengths $\lambda d1$ to $\lambda d4$ to transmit downstream data to corresponding wavelength channels, so that the downstream data is received by the ONUs 120 that work on the corresponding wavelength channels. Correspondingly, receiver wavelengths of the multiple upstream optical receivers Rx1 to Rx4 may be different from each other. Each of the upstream optical receivers Rx1 to Rx4 is corresponding to a wavelength channel in the multi-wavelength PON system 100. For example, the receiver wavelengths of the multiple upstream optical receivers Rx1 to Rx4 may be respectively $\lambda u1$ to $\lambda u4$. The upstream optical receivers Rx1 to Rx4 may respectively use the receiver wavelengths $\lambda u1$ to $\lambda u4$ to receive upstream data sent by the ONUs 120 working on the corresponding wavelength channels.

The first wavelength division multiplexer 112 is configured to perform wavelength division multiplexing processing on downstream data that is transmitted by the multiple downstream optical transmitters Tx1 to Tx4 and whose wavelengths are respectively $\lambda d1$ to $\lambda d4$, and send the downstream data to the feeder fiber 131 of the ODN 130 by using the optical coupler 111, so as to provide the downstream data for the ONU 120 by using the ODN 130. In addition, the optical couple 111 may be further configured to provide upstream data that is from the multiple ONUs 120 and whose wavelengths are separately $\lambda u1$ to $\lambda u4$ for the second wavelength division multiplexer 113, and the second wavelength division multiplexer 113 may demultiplex the upstream data whose wavelengths are respectively $\lambda u1$ to $\lambda u4$ to the upstream optical receivers Rx1 to Rx4 for data receiving.

The processing module 114 may be a Media Access Control (MAC) module. The processing module 114 may specify operating wavelength channels for the multiple ONUs 120 by means of wavelength negotiation, and provide, according to an operating wavelength channel of an ONU 120, downstream data that is to be sent to the ONU 120 for a downstream optical transmitter Tx1 to Tx4 corresponding to the wavelength channel, so that the downstream optical transmitter Tx1 to Tx4 transmits the downstream data to the corresponding wavelength channel. In addition, the processing module 114 may further perform dynamic bandwidth allocation (DBA) for upstream transmission on each wavelength channel, and allocate an upstream transmission timeslot for ONUs 120 that are multiplexed to the same wavelength channel in a TDM manner, so as to authorize the ONU 120 to send upstream data in a specific timeslot by using a corresponding wavelength channel.

An upstream transmitter wavelength and a downstream receiver wavelength of each ONU 120 are adjustable. An ONU 120 may adjust, according to a wavelength channel specified by the OLT 110, an upstream transmitter wavelength and a downstream receiver wavelength of the ONU 120 to an upstream wavelength and a downstream wavelength that are corresponding to the wavelength channel, so as to send upstream data and receive downstream data by using the wavelength channel.

An ONU 120 may include at least two ports 121, an optical module, and a processing module. Each port 121 is corresponding to a group of optical modules. The optical modules include an optical transmitter 123 and an optical receiver 122. The multiple ports 121 of the ONU may work at a same wavelength or work at different wavelengths. For example, downstream receiver wavelengths of a first port and a second port of the ONU are both $\lambda d1$, and upstream transmitter wavelengths of the first port and the second port are both $\lambda u1$. In this case, the first port and the second port of the ONU work on a first wavelength channel. If a downstream receiver wavelength of a first port of the ONU is $\lambda d1$, a downstream receiver wavelength of a second port of the ONU is $\lambda d2$, it may be understood that the first port and the second port of the ONU work on different wavelength channels. Usually, the multiple ports of the ONU work at a same wavelength. When the multiple ports of the ONU work at different wavelengths, the ONU may be in a load sharing mode or in an OLT wavelength channel backup mode. When the ONU works normally, only a laser corresponding to one port works normally. The other port is used as the second port, and a laser of the other port is in a disabled, a sleep, or an operation stopped state, but an optical receiver corresponding to the second port can work normally and receive a downstream optical signal. Certainly, the optical receiver corresponding to the second port of the ONU may also be in a disabled or sleep state, and in this case, only an optical module corresponding to the first port works normally.

The processing module 124 may be a MAC module, can perform wavelength negotiation with the OLT 110, and can adjust, according to a wavelength channel specified by the OLT 110, a receiver wavelength of the downstream optical receiver 122 and a transmitter wavelength of the upstream optical transmitter 123 (that is, adjust the downstream receiver wavelength and the upstream transmitter wavelength of the ONU 120), so that the ONU 120 works on the wavelength channel specified by the OLT 110. In addition, the processing module 124 may further control, according to a dynamic bandwidth allocation result of the OLT 110, the upstream optical transmitter 123 to send upstream data in a specified timeslot.

Compared with FIG. 1, in FIG. 2, a splitter Splitter 132 is connected to two ports of an ONU by using an optical coupler 125. The optical coupler 125 may couple upstream data sent by an upstream optical transmitter 123 corresponding to a first port 121 and upstream data sent by an upstream optical transmitter 123 corresponding to a second port 121, and provide the upstream data for the distribution fiber 133 of the ODN 130, so as to send the upstream data to the OLT 110 by using the ODN 130. In addition, the optical coupler 125 may further separately provide downstream data sent by the OLT 110 by using the ODN 130 for downstream optical receivers 122 corresponding to the first port and the second port to perform data receiving.

As shown in FIG. 1 or FIG. 2, when the multi-wavelength PON system 100 or 200 (for differentiation from FIG. 1, the PON system in FIG. 2 is identified as 200) runs, if a quantity of ONUs 120 getting online is relatively large, in an ideal situation, some ONUs 120 work on the wavelength channel 1, some work on the wavelength channel 2, some work on the wavelength channel 3, some work on the wavelength channel 4, and quantities of ONUs 120 on the wavelength channels are basically equal. However, because a user dynamically gets online/offline, or for other reasons, quantities of ONUs 120 on the wavelength channels may be different. For example, a quantity of ONUs 120 on a wavelength channel is relatively large, a quantity/quantities of ONUs 120 on another or other wavelength channels is/are relatively small, or even there is a wavelength channel used by no ONU 120, that is, a load imbalance among the wavelength channels occurs. In this case, load on a wavelength channel that is used by a relatively large quantity of ONUs 120 is relatively heavy. Because ONUs 120 that work on a same wavelength channel perform service multiplexing in a TDM manner, when a wavelength channel is overloaded, bandwidth may be insufficient, and normal services of the ONU 120 are affected.

In addition, considering energy conservation, the OLT may control ONUs to switch to a same wavelength channel, and disable the other three wavelength channels, so as to save resources.

It should be understood that, in this embodiment of the present invention, a direction in which data or an optical signal carrying data is transmitted from the OLT to the ONU is referred to as a downstream direction; correspondingly, a channel that is used by the OLT for sending an optical signal to the ONU is referred to as a downstream wavelength channel; and correspondingly, a carrier that is used to carry information or data sent by the OLT to the ONU may be referred to as a downstream frame. Similarly, a transmission direction in which data or an optical signal carrying data is transmitted from the ONU to the OLT is referred to as an upstream direction; correspondingly, a channel that is used by the ONU for sending an optical signal to the OLT is referred to as an upstream wavelength channel; and correspondingly, a carrier that is used to carry information or data sent by the ONU to the OLT may be referred to as an upstream frame.

It should be further understood that, in this embodiment of the present invention, a PON system with four wavelength channels is merely used as an example for description. However, the present disclosure is not limited thereto, and a communication method and an apparatus in the embodiments of the present invention may be further applied to another PON system that has at least two wavelength channels.

The method provided in the embodiments of the present invention can resolve problems of a load imbalance among OLT wavelength channels and energy conservation, and according to the method provided in the embodiments of the present invention, a service is not interrupted in a wavelength switching process. Details are described in the following specific embodiments.

Embodiment 1

Figure 3:
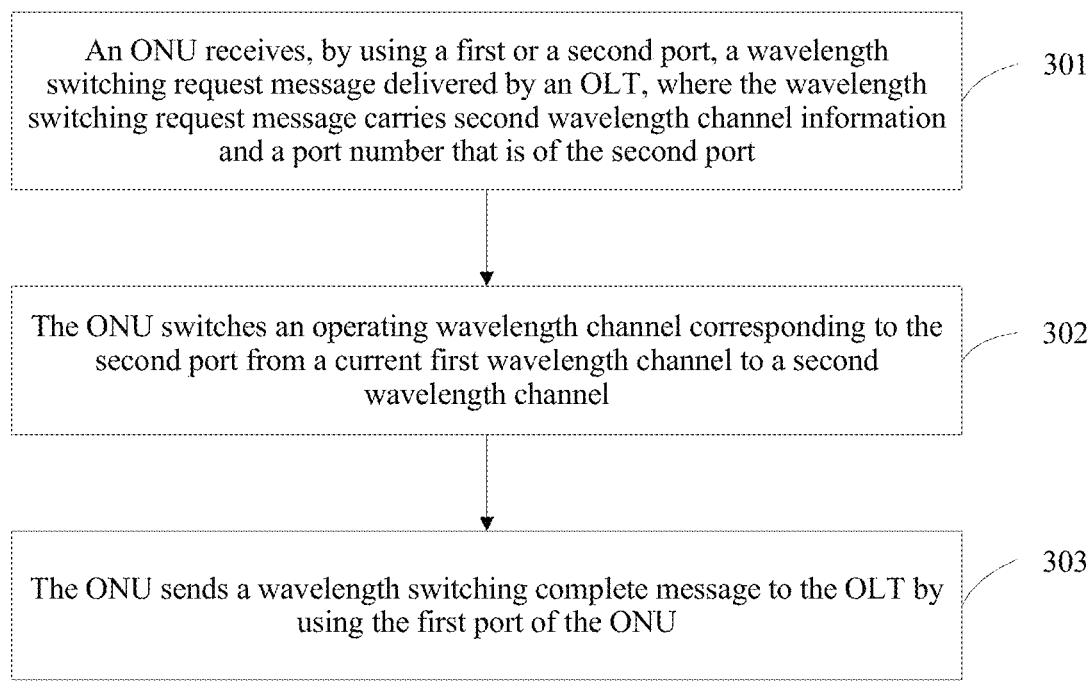
FIG. 3 is a schematic flowchart of a communication method applied to a multi-wavelength PON system according to an embodiment of the present invention.

FIG. 3 is an interaction flowchart of a communication method applied to a multi-wavelength passive optical network system according to an embodiment of the present invention. An architecture of the multi-wavelength PON may be shown in FIG. 1 or FIG. 2, or may be another multi-wavelength PON architecture. This embodiment of the present invention imposes no limitation on an architecture of the multi-wavelength PON. As long as a PON system has at least two wavelength channels, the PON system shall fall within the protection scope of the present invention. The multi-wavelength PON network includes an OLT and at least one ONU, and the ONU includes at least two ports. For ease of description, the two ports are referred to as a first port and a second port. The first port and the second port work on a first wavelength channel. Both a laser and an optical transceiver that are corresponding to the first port work normally, that is, the first port may be referred to as a primary port. A laser corresponding to the second port is in a disabled, a sleep, or an operation stopped state, and an optical receiver corresponding to the second port may be in an enabled or disabled state, that is, the second port may be referred to as a secondary port and is configured to perform a redundancy backup on a wavelength channel. It should be understood that the receiver corresponding to the second port can normally receive a downstream optical signal when the receiver is enabled, but the receiver does not work in a disabled or sleep state.

As shown in FIG. 3, the method in this embodiment includes the following steps.

Step 301: The ONU receives, by using the first or the second port, a wavelength switching request message delivered by the OLT, where the wavelength switching request message carries second wavelength channel information and port information that is of the second port.

Preferably, the ONU receives, by using the first port, the wavelength switching request message delivered by the OLT, and currently, the second port of the ONU may be in a redundancy backup state. The first wavelength channel may also be referred to as an original wavelength channel, and a second wavelength channel may also be referred to as a target wavelength channel. For term uniformity, the first wavelength channel and the second wavelength channel are used in this embodiment of the present invention.

The wavelength switching request message sent by the OLT to the ONU is used to instruct the second port of the ONU to perform wavelength switching, that is, switch a current operating wavelength from the first wavelength channel to the second wavelength channel. The wavelength switching request message further carries a start time point t0, and t0 is used to instruct the second port of the ONU to switch from the first wavelength channel to the second wavelength channel at the time point t0.

It should be noted that, the first wavelength channel and the second wavelength channel merely refer to any two channels that can work in the multi-wavelength PON system. The first wavelength channel indicates a current wavelength channel on which the ONU works, and the second wavelength channel indicates a target wavelength channel to which the OLT instructs the ONU to switch. In addition, in an actual operation, in a wavelength switching process, a wavelength pair of upstream and downstream wavelengths does not need to be bound and paired uniquely, that is, upstream wavelengths of the first wavelength channel and the second wavelength channel may be the same wavelength; likewise, downstream wavelengths of the first wavelength channel and the second wavelength channel may also be the same. That is, in this embodiment, the OLT may instruct the ONU to switch only an upstream wavelength or switch only a downstream wavelength, or switch both an upstream wavelength and a downstream wavelength.

Optionally, before sending the wavelength switching request message to the ONU, the OLT allocates a target wavelength channel for the ONU. In an actual operation, to implement a load balance (LB) among wavelength channels in the TWDM-PON system, the OLT needs to instruct the ONU to perform wavelength switching in an operation process of the ONU. For example, when a wavelength channel A is overloaded but a wavelength channel B is idle, the OLT may control, by using a wavelength switching command, some ONUs that work on the wavelength channel A to switch to the wavelength channel B by adjusting upstream transmitter wavelengths and/or downstream receiver wavelengths of the ONUs.

If there are multiple idle wavelength channels in the OLT, when the OLT allocates a target wavelength channel for the ONU, the OLT may allocate any wavelength channel in the multiple idle wavelength channels for the ONU, or select an optimal wavelength channel and allocate the optimal wavelength channel for the ONU, or select a wavelength channel according to an algorithm and allocate the wavelength channel for the ONU. This embodiment of the present invention imposes no limitation on how to select the target wavelength channel.

It should be understood that, generally, because the OLT allocates a wavelength channel in a wavelength pair manner, that an optical module of the ONU is adjusted to the second wavelength channel may be understood as that both the upstream wavelength and the downstream wavelength are adjusted. However, in some special scenarios, only the upstream wavelength is switched, or only the downstream wavelength is switched. In this embodiment of the present invention, a scenario in which only the upstream wavelength is adjusted or only the downstream wavelength is adjusted is also included.

Further, if the wavelength switching request message instructs the ONU to adjust the upstream wavelength and the downstream wavelength, the wavelength switching request message may further carry an upstream wavelength identifier and a downstream wavelength identifier. If the wavelength switching request message instructs the ONU to adjust only the upstream wavelength, the wavelength switching request message may further carry an upstream wavelength identifier. Similarly, if the wavelength switching request message instructs the ONU to adjust only the downstream wavelength, the wavelength switching request message may further carry a downstream wavelength identifier. The upstream wavelength identifier and the downstream wavelength identifier may be identified by using 0 and 1. For example, two bits are used to identify a field; 00 is used to identify the upstream wavelength; 01 is used to identify the downstream wavelength; and 10 is used to identify the upstream wavelength and the downstream wavelength. Certainly, another manner provided in the prior art may also be used to perform identification.

Further, an expression form of the second wavelength channel information may be a wavelength channel number, a wavelength length value, or another expression form used in the prior art.

Optionally, the ONU sends a wavelength switching request response message to the OLT by using the first port of the ONU.

Specifically, when the first port or the second port of the ONU receives the wavelength switching request message, the ONU feeds back the wavelength switching request response message to the OLT by using the first port of the ONU. Because a laser corresponding to the second port of the ONU is in a disabled or a sleep or an operation stopped state, and cannot send upstream light, the wavelength switching request message is responded by using a laser corresponding to the first port.

It should be understood that, when the second wavelength channel to which the OLT instructs the ONU to switch is beyond a tuning capability range of the optical module of the ONU, the wavelength switching request response message sent by the ONU carries information used to indicate that the ONU cannot perform switching. If the second wavelength channel is within a tuning capability range of the optical module of the ONU, the wavelength switching request response message sent by the ONU carries information used to indicate that the ONU determines to perform switching.

Further, the ONU may use any one of a Physical Layer Operations Administration and Maintenance (PLOAM) message, an ONT Management and Control Interface (OMCI) message, a Multi-Point Control Protocols (MPCP) message, or an Operation Administration and Maintenance (OAM) message to carry the wavelength switching request response message sent by the ONU to the OLT. In another alternative embodiment, the ONU may use a newly-defined message to carry wavelength switching time information sent to the OLT.

In an example in which the PLOAM message is used to carry the wavelength switching request response message, a message format of the PLOAM message is shown in FIG. 5, and FIG. 5 is a schematic diagram of a format of the PLOAM message. The PLOAM message generally includes an optical network unit identifier (ONU ID) field, a message identifier field, a Sequence Number (SN) field, a data field, and an integrity check field. In this embodiment of the present invention, the information indicating that the ONU determines to perform switching or cannot perform switching that is carried in the wavelength switching request response message sent by the ONU may be carried in the data field of the PLOAM message. For example, the wavelength switching request response message may use a format shown in Table 1.

TABLE 1

| Octet (Octet) | Content (Content) | Description (Description) |
| --- | --- | --- |
| 1-2 | ONU identifier (ONU ID) | Identifier of an optical network unit that performs wavelength channel switching |
| 3 | Message identifier (Message ID) | Indicates that a message type is a wavelength switching command. |
| 4 | Sequence number (Sequence No) | Matches a wavelength switching response command. |
| 5-40 | Data (Data) | Carries information related to wavelength switching, and an idle bit is 0 by default. |

TABLE 1-continued

| Octet (Octet) | Content (Content) | Description (Description) |
| --- | --- | --- |
| 41-48 | Message integrity check (MIC) | N/A |

Step 302: The ONU switches an operating wavelength channel of an optical module connected to the second port from a current first wavelength channel to a second wavelength channel.

Specifically, a MAC module of the ONU is configured to switch the operating wavelength channel of the optical module corresponding to the second port from the current first wavelength channel to the second wavelength channel.

The wavelength switching request message instructs the ONU to switch the upstream wavelength and the downstream wavelength. The ONU needs to adjust an optical receiver and an optical transmitter corresponding to the second port, to align with an upstream wavelength and a downstream wavelength of the target wavelength channel. If the wavelength switching command instructs the ONU to switch the upstream wavelength, the ONU needs to adjust only an optical transmitter corresponding to the second port, to align with the upstream wavelength. Likewise, if the wavelength switching command instructs the ONU to switch the downstream wavelength, the ONU needs to adjust only an optical receiver corresponding to the second port, to align with the downstream wavelength.

Step 303: When the second port of the ONU completes wavelength switching, the ONU sends a wavelength switching complete message to the OLT by using the first port of the ONU.

Specifically, when the second port of the ONU completes switching to the second wavelength channel, the ONU reports the switching complete message to the OLT on the first wavelength channel by using the first port or the second port.

The wavelength switching request message, the wavelength switching confirmation message, and the wavelength switching complete message all can be implemented by using a PLOAM message, an OMCI message, an MPCP message, or an OAM message.

Persons of an ordinary skill in the art should understand that, the foregoing messages may be implemented by extending a frame format based on the foregoing four frame formats provided in the prior art or by defining a new frame format. Any used format falls within the protection scope of the present disclosure.

Persons of an ordinary skill in the art should further understand that, according to a record in the prior art, a MAC module of the ONU may learn, according to a temperature, an empirical value, and a table, whether a laser or a receiver of the second port is adjusted to a target wavelength. For example, the MAC module of the ONU obtains, by reading a temperature value of the laser corresponding to the second port, a current upstream wavelength of the laser corresponding to the second port, and instructs the first port to report the switching complete message to the OLT when determining that the laser is adjusted correctly.

In this embodiment of the present invention, a first port and a second port are disposed on an ONU side, so that when the ONU performs wavelength switching, one port performs wavelength switching, the other port may still perform normal service packet interaction with an OLT, and a service is not interrupted in a wavelength switching process.

Embodiment 2

Figure 4A:
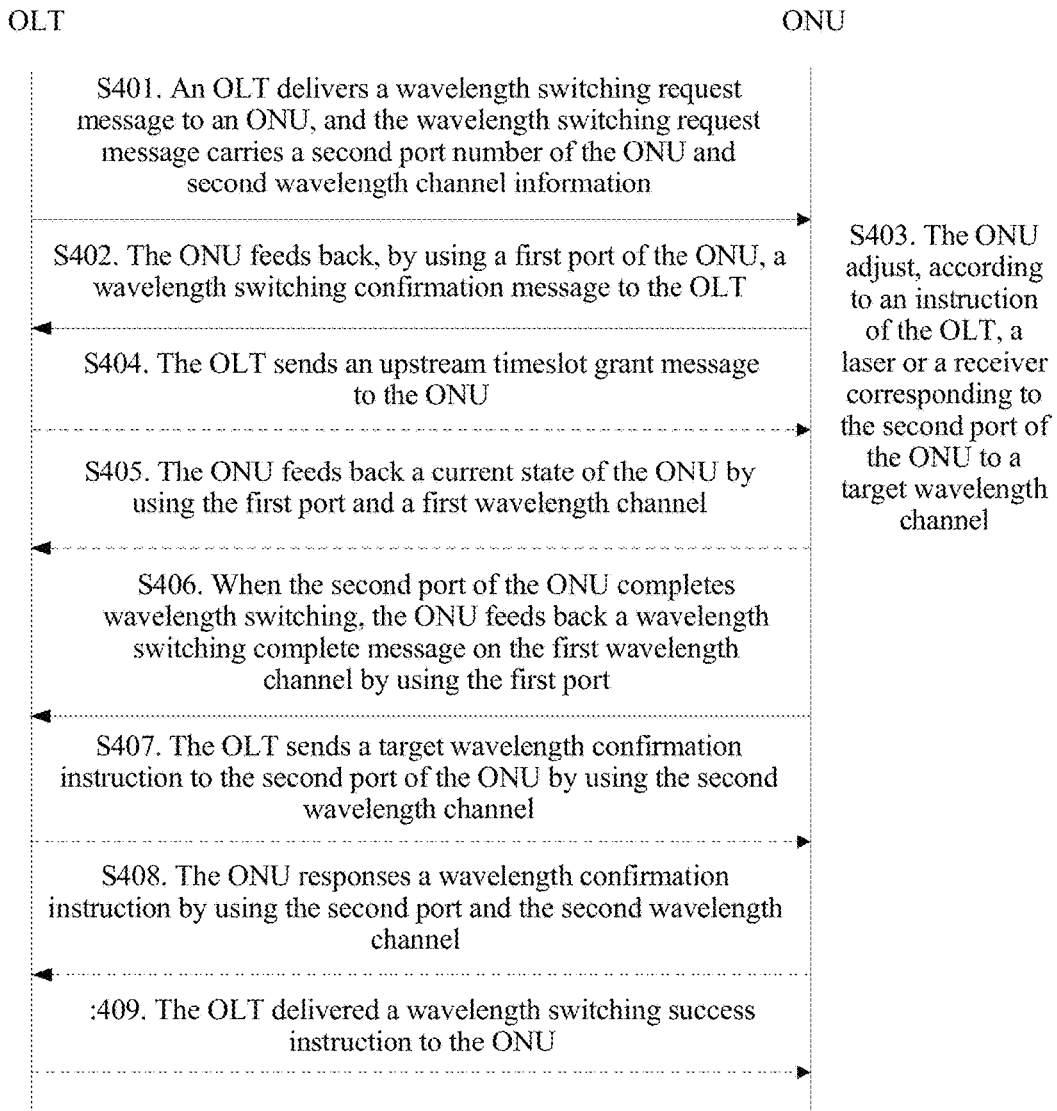
FIG. 4A is a schematic flowchart of another communication method applied to a multi-wavelength PON system according to an embodiment of the present invention.

The following further describes embodiments of the present invention with reference to a specific application scenario. FIG. 4A is an interaction flowchart of Embodiment 2 of a communication method according to an embodiment of the present invention. As shown in FIG. 4A, the method in this embodiment includes the following steps.

Step 401: An OLT delivers a wavelength switching request message to a first port or a second port of an ONU, and the wavelength switching request message carries second port information of the ONU and second wavelength channel information.

Optionally, the wavelength switching request message may further include a start time t0 that is used to instruct the ONU to perform wavelength switching.

Specifically, the OLT may use any one of a PLOAM message, an OMCI message, a MPCP message, or an OAM message to carry the wavelength switching request message sent by the OLT to the ONU. In another alternative embodiment, the OLT may use a newly-defined message to carry the wavelength switching request message sent to the ONU.

In an example in which the PLOAM message is used to carry the wavelength switching request message, a message format of the PLOAM message is shown in FIG. 5, and FIG. 5 is a schematic diagram of a format of the PLOAM message. The PLOAM message generally includes an optical network unit identifier (ONU ID) field, a message identifier field, a sequence number field, a data field, and an integrity check field. In this embodiment of the present invention, port information of the ONU and the second wavelength channel information may be carried in a data field of the PLOAM message. For example, the wavelength switching request response message may use a format shown in Table 1.

TABLE 1

| Octet (Octet) | Content (Content) | Description (Description) |
|---|---|---|
| 1-2 | ONU identifier (ONU ID) | Identifier of an optical network unit that performs wavelength channel switching |
| 3 | Message identifier (Message ID) | Indicates that a message type is a wavelength switching command. |
| 4 | Sequence number (Sequence No) | Matches a wavelength switching response command. |
| 5-40 | Data (Data) | Carries information related to wavelength switching, and an idle bit is 0 by default. |
| 41-48 | Message integrity check (MIC) | N/A |

Figure 6A:
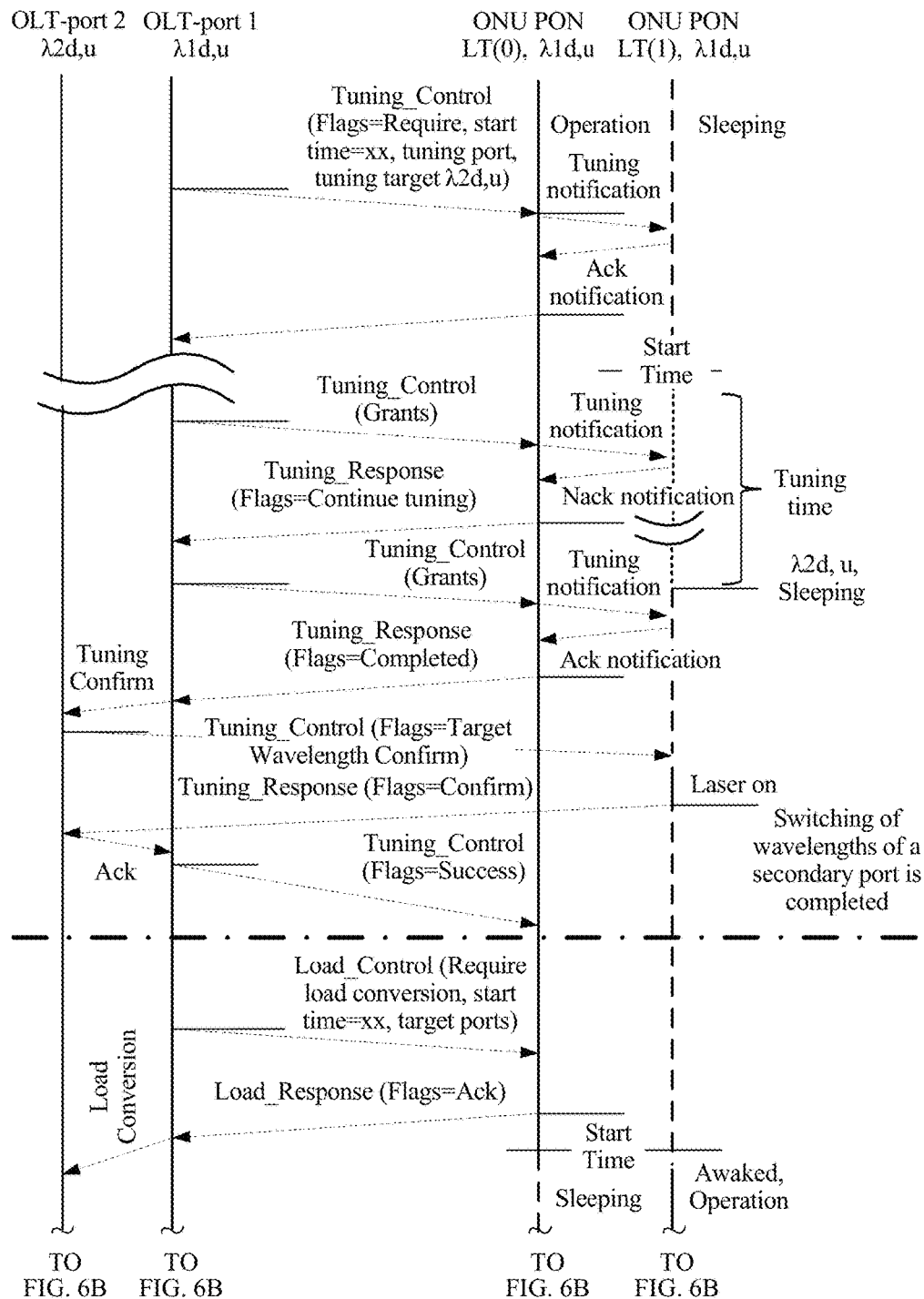
FIG. 6A and FIG. 6B are a schematic flowchart of a specific implementation manner of a communication method applied to a multi-wavelength PON system according to an embodiment of the present invention.
Figure 6B:
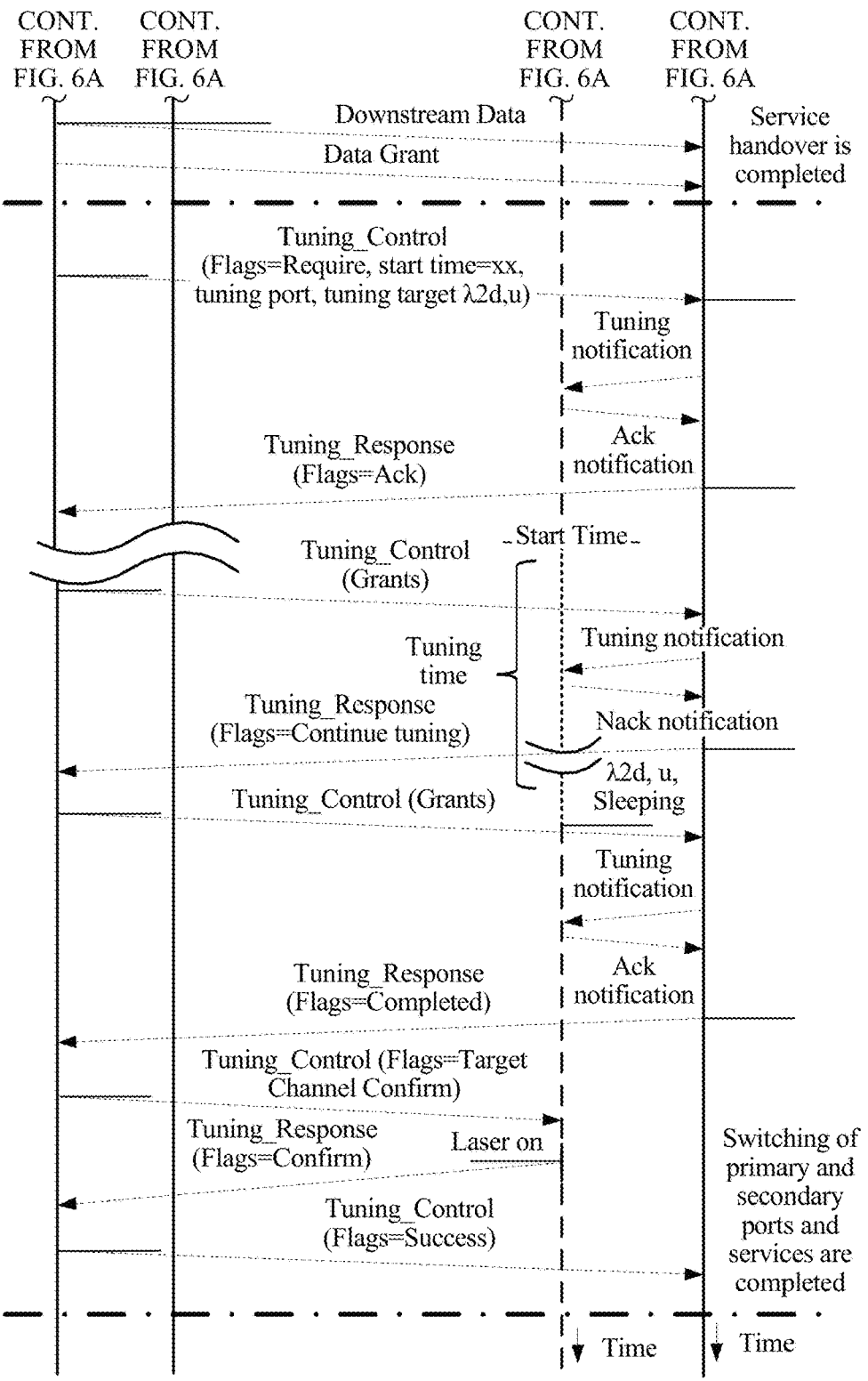

In a specific implementation manner, the wavelength switching request message may use a Tuning_Control message (one of the MPCP message) in an existing standard. The Tuning_Control message carries an adjustment start time, port information, second wavelength channel information Tuning_target. Details are shown in FIG. 6A and FIG. 6B.

It should be noted that explanations and descriptions for step 301 are further applicable to step 401, and details are not described herein.

S402. The ONU feeds back a wavelength switching confirmation message to the OLT by using the first port of the ONU.

Specifically, the ONU may use any one of a PLOAM message, an OMCI message, a MPCP message, or an OAM message to carry the wavelength switching request message sent by the OLT to the ONU. In another alternative embodiment, the ONU may use a newly-defined message to carry wavelength switching time information sent to the OLT.

In a specific implementation manner, the wavelength switching confirmation message may use a Tuning_Response message (one of the MPCP message) in an existing standard. The Tuning_Response message carries a flag bit, and the flag bit is used to identify whether the ONU agrees to perform switching. For example, that the flag bit is equal to 0 identifies that the ONU does not agree to switch the wavelength, and that the flag bit is equal to 1 identifies that the ONU agrees to perform switching. Details are shown in FIG. 6A and FIG. 6B.

It should be noted that explanations and descriptions for step 302 are further applicable to step 402, and details are not described herein.

Step 403: The ONU adjusts, according to an instruction of the OLT, a laser and/or a receiver corresponding to the second port of the ONU to the second wavelength channel.

Specifically, when receiving the wavelength switching request message from the OLT, the ONU reads a data field in the message and obtains that the OLT instructs the second port of the ONU to adjust the current upstream and downstream wavelengths to the second wavelength channel. An ONU processor controls an optical receiver and an optical transmitter corresponding to the second port of the ONU, so that the optical receiver and the optical transmitter are aligned with an upstream wavelength and a downstream wavelength of the target wavelength channel. If a wavelength switching command instructs the ONU to switch the upstream wavelength, the ONU needs to adjust only the optical transmitter corresponding to the second port, to align with the upstream wavelength. Likewise, if the wavelength switching command instructs the ONU to switch the downstream wavelength, the ONU needs to adjust only the optical receiver corresponding to the second port, to align with the downstream wavelength.

Optionally, step 404: The OLT sends an upstream timeslot grant message to the ONU.

Persons of an ordinary skill in the art should understand that, the upstream timeslot grant message sent by the OLT is used to instruct the first port of the ONU to send upstream light in the timeslot.

Optionally, step 405: In a process in which the second port of the ONU performs wavelength switching, the first port of the ONU may feed back a current state of the ONU by using a first wavelength channel.

The current state of the ONU may be wavelength being adjusted, rollback, faulty, or adjustment completed. The state information may be reported to the OLT by using the first port of the ONU.

Step 406: When the second port of the ONU completes wavelength switching, the ONU feeds back a wavelength switching complete message to the OLT by using the first port, and the wavelength switching complete message is used to identify that the second port of the ONU completes wavelength switching.

Further, the ONU may use any one of a PLOAM message, an OMCI message, a MPCP message, or an OAM message to carry the wavelength switching complete message sent by the ONU to the OLT. In another alternative embodiment, the ONU may use a newly-defined message to carry the wavelength switching complete information sent to the OLT.

In a specific implementation manner, the wavelength switching complete message may also use an existing Tuning_Response message. When a flag bit Flags of the Tuning_Response is set to 1, it indicates that the ONU completes the wavelength switching; when the flag bit Flags is set to 0, it indicates that the ONU has not completed the wavelength switching. Details are shown in FIG. 6A and FIG. 6B.

Optionally, step 407: The OLT sends a wavelength confirmation instruction to the second port of the ONU by using the second wavelength channel. In a specific implementation manner, the wavelength confirmation instruction may use an existing Tuning_Control message. When a flag bit Flags of the Tuning_Control is set to 1, it indicates that the OLT confirms that the ONU has completed the wavelength switching.

Optionally, step 408: After receiving the wavelength confirmation instruction, the second port of the ONU feeds back a wavelength confirmation response message by using the second wavelength channel.

Optionally, step 409: The OLT delivers a wavelength switching success instruction to the ONU.

It should be noted that, according to step 401 to step 409, an operating wavelength of the second port of the ONU is switched from the first wavelength channel to the second wavelength channel.

It should be specially noted that, in step 401 to step 409, an initial state of multiple ports of the ONU is that the multiple ports work on a same wavelength channel. In an actual application, the initial state of the multiple ports of the ONU may be that the multiple ports of the ONU work on different wavelength channels. In this scenario, service handover or load sharing of the ONU may be implemented according to step 410 to step 423, or step 511 to step 514.

Figure 4B:
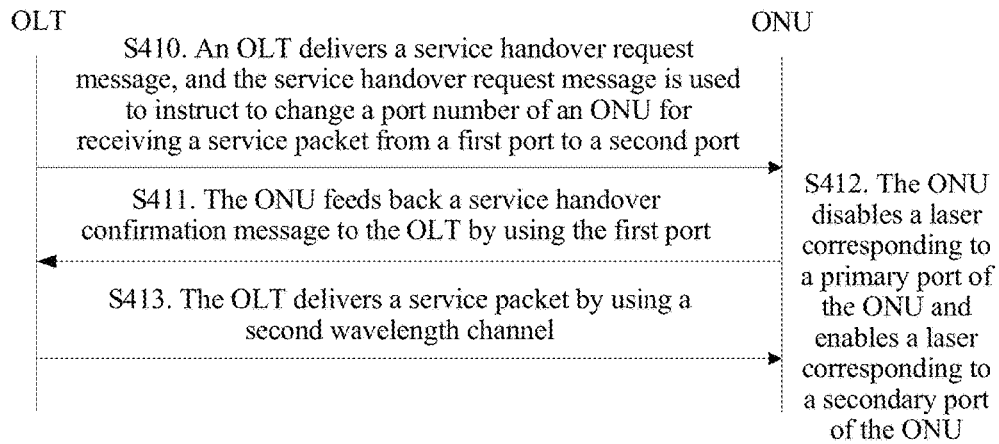
FIG. 4B is a schematic flowchart of another communication method applied to a multi-wavelength PON system according to an embodiment of the present invention.

As shown in FIG. 4B, step 410: The OLT delivers a service handover request message, and the service handover request message is used to instruct a port for performing service packet interaction between the ONU and the OLT to change from the first port to the second port, and the service handover request message carries second port information of the ONU.

Optionally, the service handover request message further carries a start time, and the start time is used to identify a start time at which the ONU performs port switching according to the instruction of the OLT.

Optionally, the service handover request message may be sent to the first port of the ONU on the first wavelength channel, or may be sent to the second port of the ONU on the second wavelength channel.

The OLT may use any one of a PLOAM message, an OMCI message, a MPCP message, or an OAM message to carry the service handover request message. In another alternative embodiment, the OLT may use a newly-defined message to carry the service handover request message.

In an example in which the PLOAM message is used to carry the wavelength switching request response message, a message format of the PLOAM message is shown in FIG. 5, and FIG. 5 is a schematic diagram of a format of the PLOAM message. The PLOAM message generally includes an optical network unit identifier (ONU ID) field, a message identifier field, a sequence number field, a data field, and an integrity check field. In this embodiment of the present invention, the second port information carried in the service handover request message sent by the OLT may be carried in the data field.

TABLE 1

| Octet (Octet) | Content (Content) | Description (Description) |
|---|---|---|
| 1-2 | ONU identifier (ONU ID) | Identifier of an optical network unit that performs wavelength channel switching |
| 3 | Message identifier (Message ID) | Indicates that a message type is a wavelength switching command. |
| 4 | Sequence number (Sequence No) | Matches a wavelength switching response command. |
| 5-40 | Data (Data) | Carries information related to wavelength switching, and an idle bit is 0 by default. |
| 41-48 | Message integrity check (MIC) | N/A |

Step 411: The ONU feeds back a service handover confirmation message to the OLT on the first wavelength channel by using the first port, or feeds back a service handover confirmation message to the OLT on the second wavelength channel by using the second port.

Further, after receiving the service handover confirmation message sent by the ONU, the OLT refreshes a configuration and hands over a traffic flow from the first wavelength channel to the second wavelength channel.

Step 412: The ONU disables a laser corresponding to the first port of the ONU.

That the ONU disables the first wavelength channel corresponding to the first port may be understood as follows: The first port is in a sleep or a doze state, and the ONU wakes up the second port.

Step 413: The OLT delivers a service packet by using the second wavelength channel, and the ONU receives, on the second wavelength channel by using the second port, the service packet delivered by the OLT.

Till step 413, the OLT establishes service communication with the second port of the ONU, and a handover of the service from the first port to the second port succeeds.

Further, in a specific implementation manner, the interaction messages mentioned in step 410 to step 413 may use existing message formats, for example, a Tuning_Control message, and a Tuning_Response message. Specific content is shown in FIG. 6A and FIG. 6B.

It should be noted that, according to steps 410 to 413, a service communication channel between the OLT and the second port of the ONU is established by using the second wavelength channel. In this case, the original second port becomes active, and the original first port becomes standby. Use of the original first wavelength channel is stopped, and communication between the OLT and the ONU is performed by using the second wavelength channel.

After performing service port switching, the ONU may further adjust an operating wavelength of the first port from the first wavelength channel to the second wavelength channel. The process is the same as the process, mentioned in step 401 to step 409, in which the operating wavelength of the second port is adjusted from the first wavelength channel to the second wavelength channel. Details are shown in FIG. 4C.

Figure 4C:
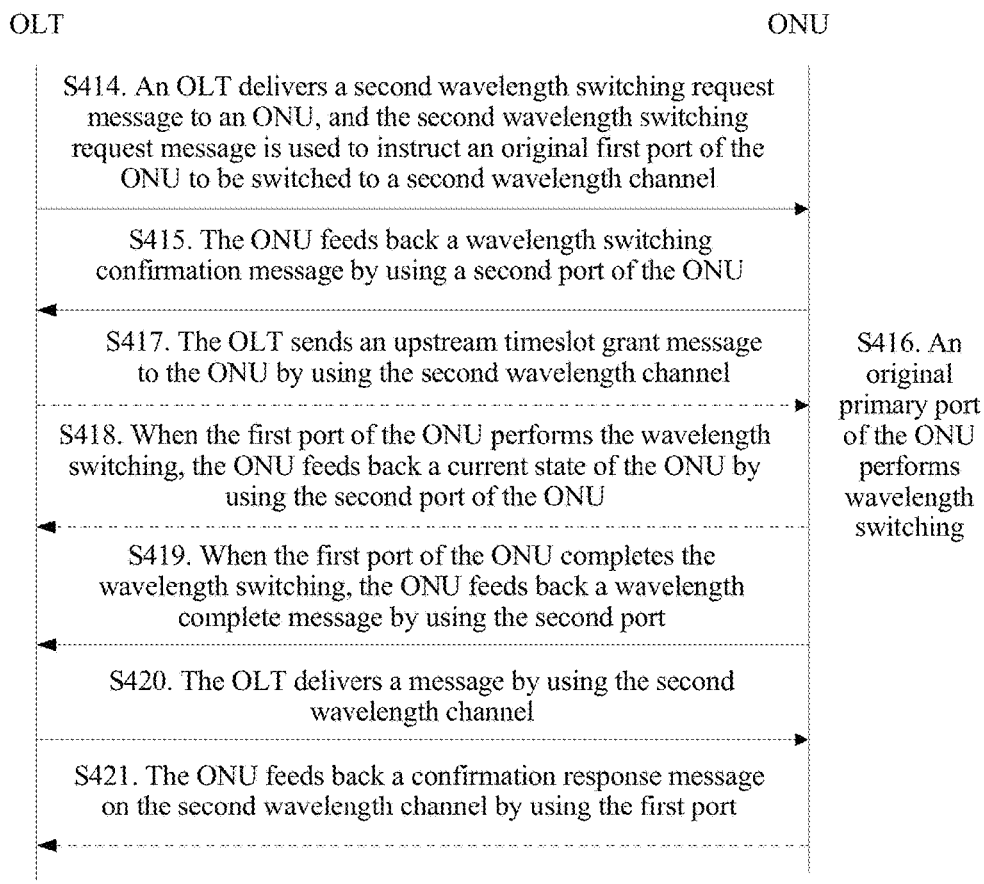
FIG. 4C is a schematic flowchart of another communication method applied to a multi-wavelength PON system according to an embodiment of the present invention.

As shown in FIG. 4C, step 414: The OLT delivers a second wavelength switching request message to the ONU, and the second wavelength switching request message is used to instruct the original first port of the ONU to switch from the first wavelength channel to the second wavelength channel, and the second wavelength switching request message carries the port information of the original first port and the second wavelength channel information. For a format of the second wavelength switching request message, reference may be made to the description in step 301, and details are not described herein. The ONU may receive the second wavelength switching request message on the first wavelength channel by using the first port, or may receive the second wavelength switching request message on the second wavelength channel by using the second port.

Optionally, the second wavelength switching request message may further carry a start time of wavelength switching.

Step 415: The ONU feeds back a wavelength switching confirmation message on the second wavelength channel by using the second port of the ONU.

Step 416: The ONU switches an operating wavelength channel of an optical module connected to the first port from the first wavelength channel to the second wavelength channel.

Optionally, step 417: The OLT sends an upstream timeslot grant message to the ONU by using the second wavelength channel.

Optionally, step 418: In a process in which the original first port of the ONU performs wavelength switching, the ONU feeds back a current state of the ONU by using the second port of the ONU.

Step 419: When the original first port of the ONU completes wavelength switching, the ONU feeds back a second wavelength switching complete message to the OLT on the second wavelength channel by using the second port of the ONU.

Step 420: The OLT delivers a wavelength switching complete response message by using the second wavelength channel.

Optionally, step 421: The ONU feeds back a confirmation response message on the second wavelength channel by using the first port of the ONU.

It should be understood that, step 414 to step 421 are used to implement an adjustment of the first port of the ONU from the first wavelength channel to the second wavelength channel. A principle of step 414 to step 421 is the same as that of step 401 to step 409; and therefore, the description recorded in step 401 to step 409 is also applicable to step 414 to step 421.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

Specifically, all messages exchanged between the OLT and the ONU may use the MPCP protocol or the OAM protocol, and quick wavelength switching or a load switching function is implemented by extending an MPCPDU or OAMDU frame structure.

Further, when wavelength switching is being performed, the wavelength switching request message may be implemented, for example, by extending a TUNING_CONTROL frame structure in the MPCP or OAM protocol, for example, by adding a new Target Ports target port domain, or extending a Flags domain by adding a new target wavelength delivery confirmation message. Details are shown in Table 2.

TABLE 2

| Domain | Byte |
|---|---|
| Destination address | 6 |
| Original address | 6 |
| Length/Type | 2 |
| Operating code | 2 |

TABLE 2-continued

| Domain | Byte |
|---|---|
| Timestamp | 4 |
| Grant quantity/Flag bit | 2 |
| Target wavelength channel | 2 |
| Grant start time | 4 |
| Grant length | 2 |
| Target port | 2 |
| Synchronization time | 2 |
| Reserved field | 29 |
| Check digit | 4 |

Further, in a wavelength switching process, a current switching state packet is fed back by using the first port. A TUNING_RESPONSE frame structure may be extended in the MPCP or OAM protocol, and the Flags domain (which is corresponding to a flag bit in Table 3) is extended by adding a state such as a wavelength being handed over, faulty, a wavelength being rolled back, switching completed, a wavelength confirmation feedback, or the like. Table 3 is shown in the following:

TABLE 3

| Domain | Byte |
|---|---|
| Destination address | 6 |
| Original address | 6 |
| Length/Type | 2 |
| Operating code | 2 |
| Timestamp | 4 |
| Flag bit | 2 |
| Grant start time | 4 |
| Grant length | 2 |
| Synchronization time | 2 |
| Reserved field | 29 |
| Check digit | 4 |

It should be understood that, this embodiment of the present invention is merely an example for describing a definition of how to implement a wavelength switching message by extending a frame structure in the prior art. Certainly, persons of ordinary skill in the art may implement all related message packets mentioned in the present disclosure by using a user-defined packet format based on the prior art or by performing extension based on the existing standard. All other embodiments obtained without creative efforts shall fall within the protection scope of the present invention.

In this embodiment of the present invention, according to step 401 to step 421, all the two ports of the ONU complete switching from the first wavelength channel to the second wavelength channel. Normal communication of services is ensured in a switching process.

Embodiment 3

Figure 7A:
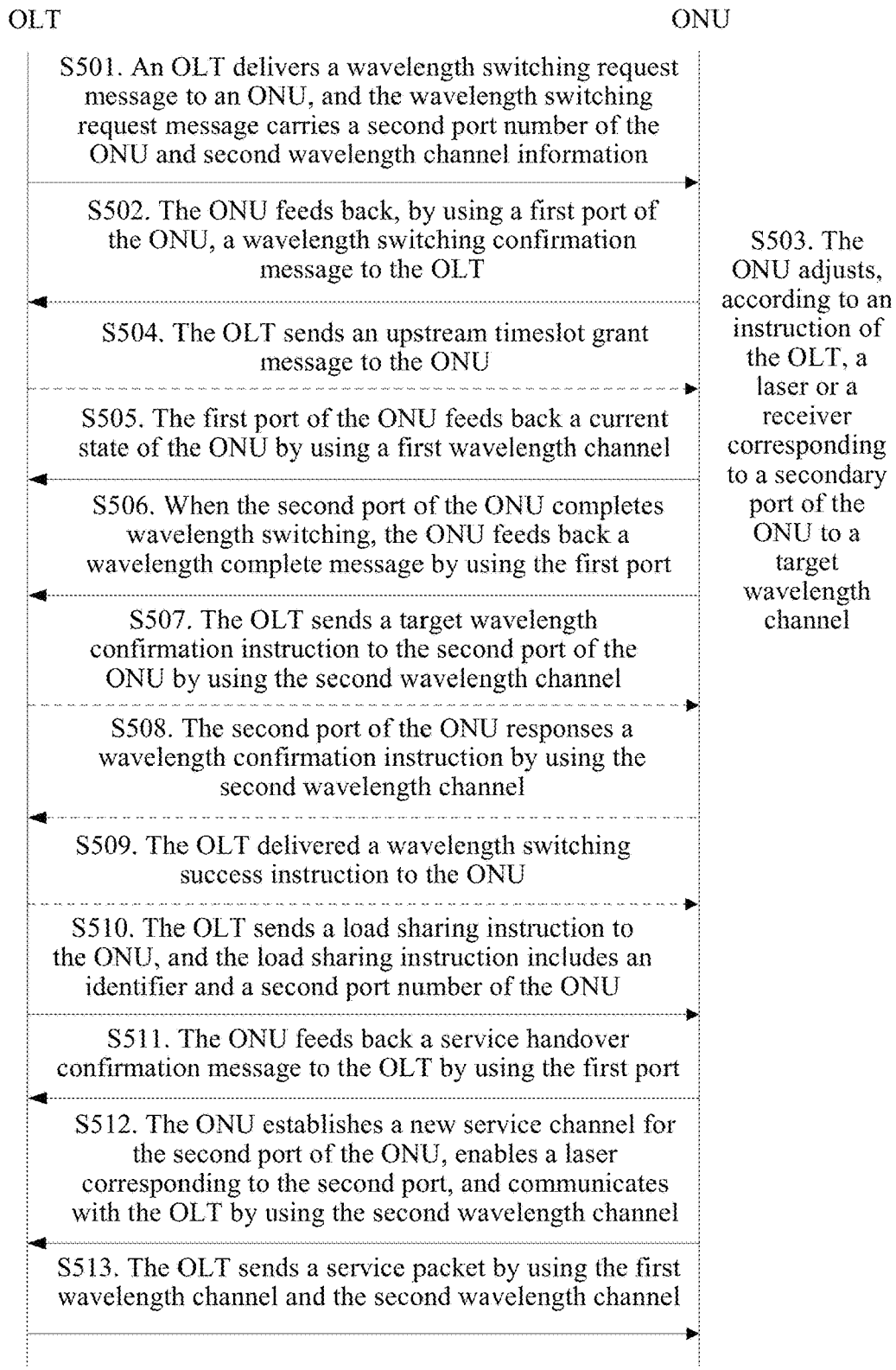
FIG. 7A is a schematic flowchart of a load sharing method according to an embodiment of the present invention.

Wavelength switching has another important application, that is, load sharing. The following further describes embodiments of the present invention with reference to an application scenario of load sharing. FIG. 7A is an interaction flowchart of Embodiment 3 of a wavelength switching method according to an embodiment of the present invention. As shown in FIG. 7A, the method in this embodiment includes the following steps.

For step 501 to step 509, reference may be made to step 401 to step 409 in Embodiment 2. Step 501 to step 509 are the same as step 401 to step 409. According to step 501 to step 509, a second port of an ONU is switched from a first wavelength channel to a second wavelength channel.

Step 510: The OLT sends a load sharing request message to the ONU, the load sharing request message includes an identifier and second port information of the ONU, and the load sharing request message is used to instruct the ONU to enable the optical module corresponding to the second port of the ONU, so that the optical module works normally and shares all services with an optical module corresponding to the first port, or reduces load on an optical module corresponding to the first port; the ONU receives, at a second wavelength by using the second port, a service offloading request message delivered by the OLT; or the ONU receives, on the first wavelength channel by using the first port, a service offloading request message delivered by the OLT.

The OLT may use any one of a PLOAM message, an OMCI message, a MPCP message, or an OAM message to carry the load sharing request message. In another alternative embodiment, the OLT may use a newly-defined message to carry the load sharing request message.

In an example in which the PLOAM message is used to carry the load sharing request message, a message format of the PLOAM message is shown in FIG. 5, and FIG. 5 is a schematic diagram of a format of the PLOAM message. The PLOAM message generally includes an optical network unit identifier (ONU ID) field, a message identifier (Message ID) field, a sequence number field, a data field, and an integrity check field. In this embodiment of the present invention, the second port information carried in the service handover request message sent by the OLT may be carried in the data field.

TABLE 1

| Octet (Octet) | Content (Content) | Description (Description) |
|---|---|---|
| 1-2 | ONU identifier (ONU ID) | Identifier of an optical network unit that performs wavelength channel switching |
| 3 | Message identifier (Message ID) | Indicates that a message type is a wavelength switching command. |
| 4 | Sequence number (Sequence No) | Matches a wavelength switching response command. |
| 5-40 | Data (Data) | Carries information related to wavelength switching, and an idle bit is 0 by default. |
| 41-48 | Message integrity check (MIC) | N/A |

Figure 7B:
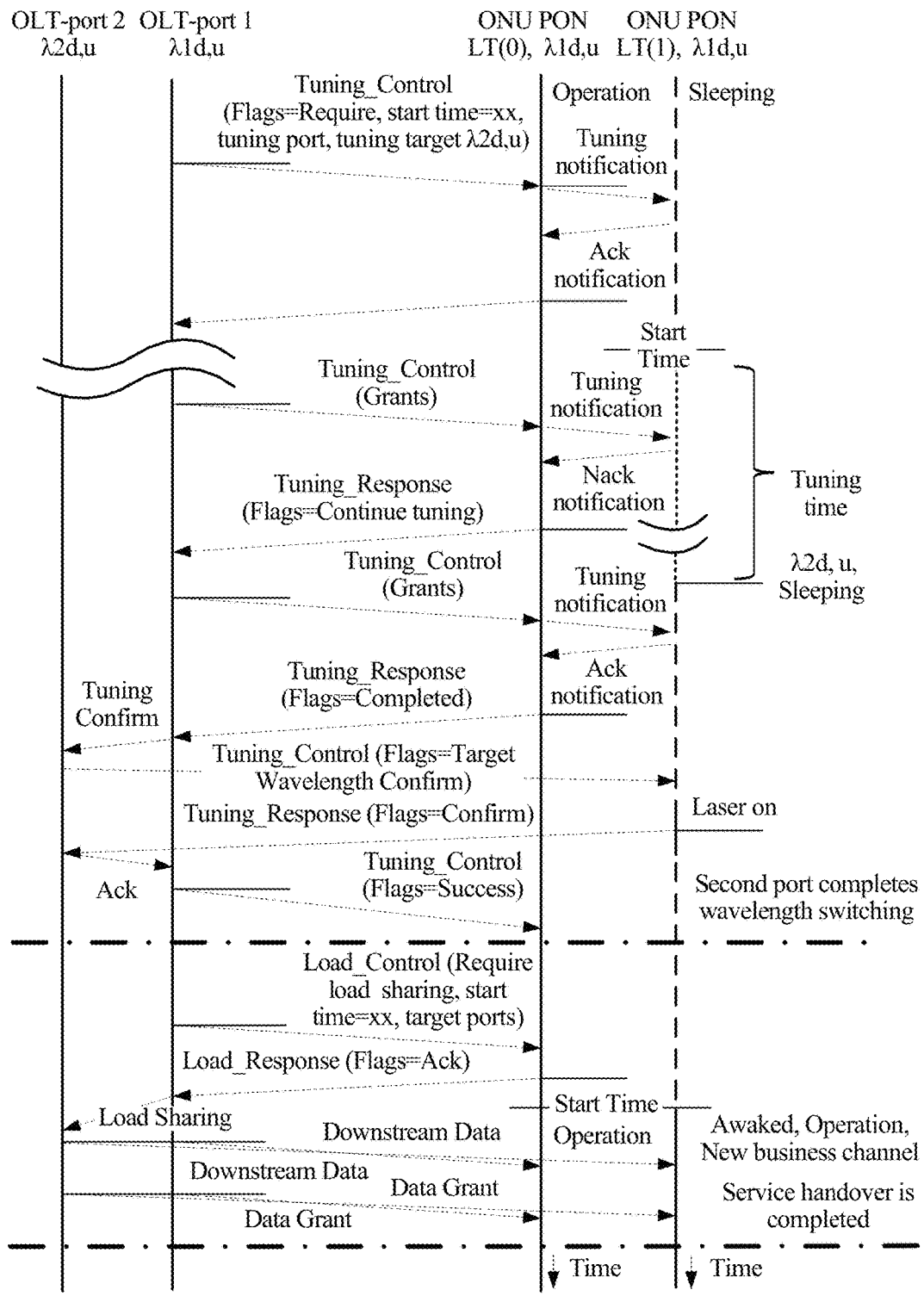
FIG. 7B is a schematic flowchart of a specific load sharing implementation manner according to an embodiment of the present invention.

In a specific implementation manner, the load sharing request message may also use a Load_Control message, and the Load_Control message carries a flag bit, a start time, and port information. Details are shown in FIG. 7B.

Step 511: The ONU feeds back a service offloading confirmation message to the OLT on the first wavelength channel by using the first port.

Step 512: The ONU establishes a new service channel for the second port of the ONU, enables a laser corresponding to the second port, and communicates with the OLT by using the second wavelength channel; in this case, two ports of the ONU work normally, and load sharing is implemented.

Specifically, a MAC module of the ONU establishes the new service channel for the second port of the ONU and disables a redundancy backup.

Step 513: The OLT sends a service packet by using the first wavelength channel and the second wavelength channel, and the ONU receives, by using the first port and the second port, the service packet delivered by the OLT.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

Further, the load sharing packet may also be implemented by using an MPCPDU or an OAMDU. Persons of an ordinary skill in the art may implement the load sharing packet by defining a new frame structure or by extending a frame structure in the existing standard. In Table 4, the load sharing request message is implemented by defining a new frame structure that is named LOAD_CONTROL. Details are shown in Table 4.

TABLE 4

| Domain | Byte |
|---|---|
| Destination address | 6 |
| Original address | 6 |
| Length/Type | 2 |
| Operating code | 2 |
| Timestamp | 4 |
| Grant quantity/Flag bit | 2 |
| Grant start time | 4 |
| Grant length | 2 |
| Synchronization time | 2 |
| Port information | 2 |
| Reserved field | 29 |
| Check digit | 4 |

It should be understood that, this embodiment of the present invention is merely an example for describing a definition of how to implement a message involved in a load sharing process by extending a frame structure in the prior art. Certainly, persons of ordinary skill in the art may implement all related message packets mentioned in the present disclosure by using a user-defined packet format based on the prior art or by performing extension based on the existing standard. All other embodiments obtained without creative efforts shall fall within the protection scope of the present invention.

According to step 501 to step 513, the OLT may perform service communication with the first port and the second port of the ONU by using the first wavelength channel and the second wavelength channel respectively, so as to implement load sharing and increase a bandwidth capacity of the ONU.

Embodiment 4

Figure 8:
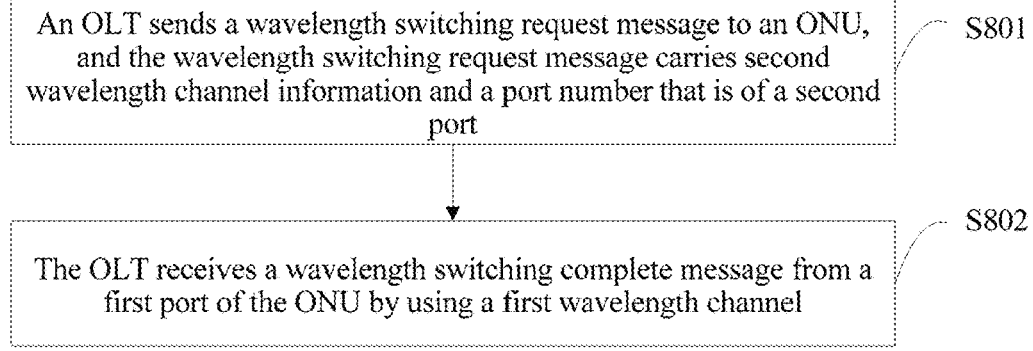
FIG. 8 is a schematic flowchart of another communication method applied to a multi-wavelength PON system according to an embodiment of the present invention.

FIG. 8 is an interaction flowchart of a wavelength switching method according to an embodiment of the present invention. As shown in FIG. 8, the method in this embodiment includes the following steps.

Step 801: An OLT sends a wavelength switching request message to the ONU, and the wavelength switching request message carries second wavelength channel information and port information that is of the second port.

Preferably, the OLT sends the wavelength switching request message to a first port of the ONU.

Optionally, the OLT receives a wavelength switching confirmation message that is sent from a first wavelength channel and on the first port of the ONU.

Step 802: The OLT receives a wavelength switching complete message that is sent from the first port of the ONU by using a first wavelength channel.

Optionally, the OLT sends a wavelength switching confirmation message to the ONU by using a second wavelength channel.

In this embodiment of the present invention, optionally, the method further includes: The OLT receives current state information of the ONU that is sent from the first port of the ONU by using the first wavelength channel.

In this embodiment of the present invention, optionally, the method further includes: The OLT sends, to the second port of the ONU, a grant message of an upstream light-emitting timeslot that is allocated for the second port; and the OLT receives, by using the second wavelength channel, upstream light sent from the second port of the ONU.

In this embodiment of the present invention, optionally, the method further includes: The OLT sends a service handover message to the first port of the ONU, where the service handover message is used to instruct to change a port for performing service packet interaction between the ONU and the OLT from the first port to the second port, and the service handover message carries an ONU identifier and second port information. Optionally, the service handover message may further carry a service handover start time t0.

The OLT receives a service handover confirmation message sent from the first port of the ONU.

The OLT sends a service packet to the second port of the ONU by using the second wavelength channel.

In this embodiment of the present invention, optionally, the method further includes: The OLT sends a second wavelength switching request message to the ONU, and the second wavelength switching request message is used to instruct the first port of the ONU to switch an operating wavelength from the first wavelength channel to the second wavelength channel, and the second wavelength switching request message carries the second wavelength channel information and port information of the first port.

The OLT receives, by using the second wavelength channel, a second wavelength switching confirmation message sent from the second port of the ONU.

The OLT receives, by using the second wavelength channel, a wavelength switching complete message sent from the second port of the ONU.

In this embodiment of the present invention, optionally, the method further includes: The OLT sends a service offloading request message to the first port of the ONU by using the first wavelength channel, or sends a service offloading request message to the second port of the ONU by using the second wavelength channel, where the service offloading request message is used to instruct the ONU to enable an optical module corresponding to the second port to work normally.

The OLT receives, by using the first wavelength channel, a service offloading confirmation message sent from the first port of the ONU.

The OLT receives a testing message from the first port and the second port of the ONU by using the first wavelength channel and the second wavelength channel respectively, and the testing message is used to test whether a service channel between the OLT and the first port of the ONU and a service channel between the OLT and the second port of the ONU are established.

It should be understood that, Embodiment 4 is described for Embodiment 2 and 3 based on an OLT side. The frame structure mentioned in Embodiment 2 and 3 is also applicable to this embodiment of the present invention.

In this embodiment of the present invention, a first port and a second port are disposed on an ONU side, so that when an ONU performs wavelength switching, one port performs switching, the other port may still perform normal service packet interaction with an OLT, and a service is not interrupted in a wavelength switching process.

Embodiment 5

Figure 9:
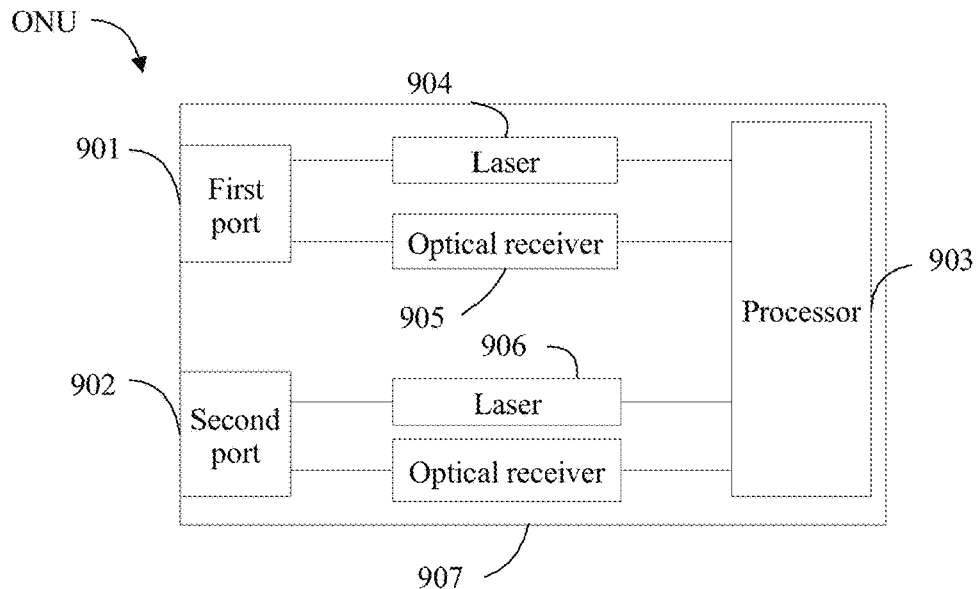
FIG. 9 is a schematic structural diagram of an optical network unit ONU according to an embodiment of the present invention.

FIG. 9 is a schematic structural diagram of an optical network unit ONU according to an embodiment of the present invention. As shown in FIG. 9, the optical network unit ONU 90 includes a first port 901, a second port 902, and a processor 903. The first port 901 is connected to a first laser 904 and a first receiver 905, and the first laser 904 and the first receiver 905 are collectively referred to as a first optical module. The second port 902 is connected to a second laser 906 and a second receiver 907, and the second laser 906 and the second receiver 907 are collectively referred to as a second optical module. The first laser 904, the first receiver 905, the second laser 906, and the second receiver 907 are all connected to the processor 903, and the first port and the second port work on a first wavelength channel. The ONU specifically includes the first port 901, the second port 902, and the processor 903.

The first port 901 is configured to receive a service packet from an OLT, or configured to receive a wavelength switching request message delivered by an OLT, where the wavelength switching request message carries second wavelength channel information and port information that is of the second port, and transmit the wavelength switching request message to the processor 903.

The second port 902 is configured to: when the first receiver is configured to receive a service packet from the OLT, receive the wavelength switching request message delivered by the OLT, where the wavelength switching request message carries the second wavelength information and the port information that is of the second port; or when the first receiver is configured to receive the wavelength switching request message delivered by the OLT, and the wavelength switching request message carries second wavelength channel information and port information that is of the second port, perform a redundancy backup of the ONU.

The first port 901 is configured to send a wavelength switching confirmation message to the OLT, and the wavelength switching confirmation message carries information that is used to identify whether the ONU performs switching.

The second port 902 is in a disabled or sleep state or an out-of-service state.

The processor 903 is configured to switch a second optical module corresponding to the second port from the first wavelength channel to the second wavelength channel, and is further configured to generate the wavelength switching confirmation message and transmit the wavelength switching confirmation message to the first port 901.

The first port 901 is further configured to send a wavelength switching complete message to the OLT.

It should be understood that, the ONU may receive the wavelength switching request message from the OLT by using the first port or the second port of the ONU. Therefore, when the wavelength switching request message is received by using the first port of the ONU, the first port 901 receives both the service packet from the OLT and the wavelength switching request message from the OLT, and reports the wavelength switching request message to the processor 903 of the ONU. In this case, the second port of the ONU is configured to perform a redundancy backup. When the wavelength switching request message is received by using the second port of the ONU, the first port 901 is configured to receive only the service packet from the OLT, and the second port 902 is configured to receive the wavelength switching request message from the OLT, and report the wavelength switching request message to the processor 903 of the ONU.

In this embodiment of the present invention, optionally, the first port 901 of the ONU is further configured to receive an upstream timeslot grant message from the OLT.

In this embodiment of the present invention, optionally, the first port 901 of the ONU is further configured to: when the second port 902 of the ONU performs wavelength switching, feed back a current ONU state by using the first wavelength channel.

In this embodiment of the present invention, optionally, the second port 902 of the ONU is further configured to receive a wavelength confirmation instruction from the OLT by using the second wavelength channel.

The second port 902 of the ONU is further configured to: after receiving the wavelength confirmation instruction, feed back a wavelength confirmation response message by using the second wavelength channel.

In this embodiment of the present invention, optionally, the second port 902 of the ONU is further configured to receive a wavelength switching success instruction from the OLT on the second wavelength channel.

Optionally, the first port 901 of the ONU is further configured to receive a wavelength switching success instruction from the OLT on the first wavelength channel.

In this embodiment of the present invention, optionally, the first port 901 of the ONU is further configured to receive a service handover instruction from the OLT; or the second port 902 of the ONU is further configured to receiver a service handover instruction from the OLT. The service handover instruction is used to instruct to switch a service packet receiving port of the ONU from the first port 901 to the second port 902, and the service handover instruction carries second port information of the ONU.

Further, the service handover instruction carries a start time at which the ONU performs port switching according to the instruction of the OLT.

In this embodiment of the present invention, optionally, the first port 901 of the ONU is further configured to feed back a service handover confirmation message to the OLT.

In this embodiment of the present invention, optionally, the processor 903 of the ONU is further configured to disable the first laser 904 corresponding to the first port of the ONU and enable the second laser 906 corresponding to the second port 902.

In this embodiment of the present invention, optionally, the first port 901 of the ONU is further configured to receive a second wavelength switching request message from the OLT, and the second wavelength switching request message is used to instruct a laser and/or a receiver corresponding to the first port of the ONU to switch from the first wavelength channel to the second wavelength channel, and the second wavelength switching request message carries port information of the first port and the second wavelength channel information.

In this embodiment of the present invention, optionally, the second port 902 of the ONU is further configured to send a second wavelength switching confirmation message to the OLT on the second wavelength channel.

In this embodiment of the present invention, optionally, the processor 903 of the ONU is further configured to control a laser and/or a receiver corresponding to the first port 901 to switch from the first wavelength channel to the second wavelength channel.

In this embodiment of the present invention, optionally, the second port 902 of the ONU is further configured to receive an upstream timeslot grant message from the OLT on the second wavelength channel.

In this embodiment of the present invention, optionally, the second port 902 of the ONU is further configured to: when the first port 901 of the ONU performs wavelength switching, feed back a current state of the ONU by using the second wavelength channel.

The current state of the ONU may be a state such as switching, faulty, rollback, or switching-completed.

In this embodiment of the present invention, optionally, the second port 902 of the ONU is further configured to send a second wavelength switching complete message to the OLT by using the second wavelength channel; or the first port 901 of the ONU is further configured to send a second wavelength switching complete message to the OLT by using the second wavelength channel. The second wavelength switching complete message is used to identify a switch of an operating wavelength channel of an optical module corresponding to the first port 901 of the ONU from the first wavelength channel to the second wavelength channel.

Optionally, the first port 901 of the ONU is further configured to receive a second wavelength switching instruction from the OLT by using the second wavelength channel.

Optionally, the first port 901 of the ONU is further configured to send a second wavelength switching response message by using the second wavelength channel. It should be understood that an optical network unit in this embodiment of the present invention may be corresponding to the ONU in corresponding procedures of FIG. 4A to FIG. 7B, and the foregoing and other operations and/or functions of the modules are separately used to implement corresponding procedures of the methods in FIG. 4A to FIG. 7B. For brevity, details are not described herein again.

It should be further understood that, for each message format and content in this embodiment of the present invention, reference may be made to a record of Embodiment 2 or 3, and details are not described herein.

In this embodiment of the present invention, a first port and a second port are disposed on an ONU side, so that when an ONU performs wavelength switching, one port performs switching, the other port may still receive a downstream service packet normally, and a service is not interrupted in a wavelength switching process.

Embodiment 6

Figure 10:
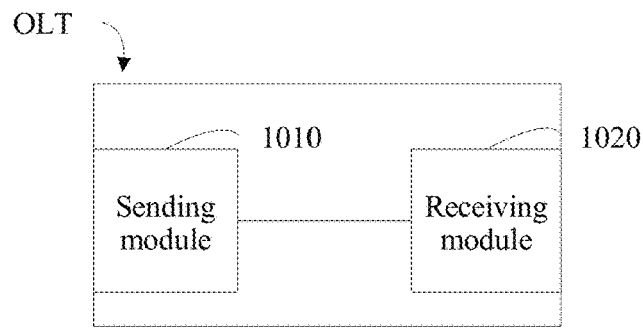
FIG. 10 is a schematic structural diagram of an optical line terminal OLT according to an embodiment of the present invention.

This embodiment of the present invention provides a schematic structural diagram of an optical line terminal OLT that is applied to a multi-wavelength PON system. The multi-wavelength PON includes an optical line terminal OLT and at least one optical network unit ONU. The ONU includes a first port and a second port. The first port and the second port work on a first wavelength channel. As shown in FIG. 10, the optical line terminal 100 includes:

a sending module 1010, configured to send a wavelength switching request message to the ONU, where the wavelength switching request message carries second wavelength channel information and port information that is of the second port, and the wavelength switching request message is used to identify a switch of an operating wavelength of an optical module corresponding to the second port of the ONU from a first wavelength channel to a second wavelength channel; and a receiving module 1020, configured to receive, on the first wavelength channel, a wavelength switching complete message sent from the first port of the ONU, where the wavelength switching complete message is used to identify that the optical module corresponding to the second port of the ONU completes wavelength switching.

In this embodiment of the present invention, optionally, the receiving module 1020 is further configured to receive, on the first wavelength channel, current state information of the ONU that is sent from the first port of the ONU. The current state information of the ONU includes switching, faulty, rollback, and switching completed, and the like.

Optionally, the OLT further includes a processing module 1030, and the processing module 1030 is configured to generate the wavelength switching request message and transmit the wavelength switching request message to the sending module 1010.

Optionally, the processing module 1030 is further configured to receive a wavelength switching confirmation message transmitted from the receiving module 1020.

Optionally, the processing module 1030 is further configured to allocate an upstream light-emitting timeslot for the ONU.

In this embodiment of the present invention, optionally, the sending module 1010 is further configured to send a grant message of the upstream light-emitting timeslot to the ONU.

In this embodiment of the present invention, optionally, the receiving module 1020 is further configured to receive, on the second wavelength channel, upstream light sent from the second port of the ONU.

In this embodiment of the present invention, optionally, the sending module 1010 is further configured to send a service handover message to the first port of the ONU, and the service handover message is used to instruct the ONU to change an interaction port of a service packet from the first port to the second port. The service handover message carries second port information.

Further, the service handover message further carries a service handover start time t0.

In this embodiment of the present invention, optionally, the processing module 1030 is further configured to generate the service handover message and transmit the service handover message to the sending module 1010.

In this embodiment of the present invention, the receiving module 1020 is further configured to receive a service handover confirmation message sent from the first port of the ONU, and the service handover confirmation message is used to identify whether the ONU performs service handover.

Optionally, the processing module 1030 is further configured to: after receiving the service handover confirmation message sent by the ONU, refresh a configuration and hand over a traffic flow from the first wavelength channel to the second wavelength channel.

In this embodiment of the present invention, the sending module 1010 is further configured to send a service packet to the second port of the ONU on the second wavelength channel.

In this embodiment of the present invention, the sending module 1010 is further configured to send a second wavelength switching request message to the second port of the ONU, and the second wavelength switching request message is used to instruct to switch an operating wavelength of an optical module corresponding to the first port of the ONU from the first wavelength channel to the second wavelength channel, and the second wavelength switching request message carries the second wavelength channel information and port information of the first port.

In this embodiment of the present invention, the receiving module 1020 is further configured to receive, on the second wavelength channel, a second wavelength switching confirmation message sent from the second port of the ONU, and receive, on the second wavelength channel, a second wavelength switching complete message sent from the second port of the ONU. The second wavelength switching confirmation message is used to identify whether the ONU agrees to perform wavelength switching of the optical module of the first port, and the second wavelength switching complete message is used to identify that the ONU completes the wavelength switching of the optical module corresponding to the first port.

In this embodiment of the present invention, optionally, the sending module 1010 is further configured to send a service offloading request message to the first port of the ONU on the first wavelength channel or to the second port of the ONU on the second wavelength channel. The service offloading request message is used to instruct the ONU to enable the optical module corresponding to the second port to work normally, and the service offloading request message carries port information of the second port.

In this embodiment of the present invention, optionally, the receiving module 1020 is further configured to receive, on the first wavelength channel, a service offloading confirmation message sent from the first port of the ONU, and separately send a service packet on the first wavelength channel and the second wavelength channel.

The wavelength switching request message carries a start time t0 at which the second port performs wavelength switching.

It should be understood that the optical line terminal OLT in this embodiment of the present invention may be corresponding to the OLT in FIG. 4A to FIG. 7A, and the foregoing and other operations and/or functions of the modules are separately used to implement corresponding procedures of the methods in FIG. 4A to FIG. 7A. For brevity, details are not described herein again.

It should be further understood that, for each message format and content in this embodiment of the present invention, reference may be made to a record of Embodiment 2 or 3, and details are not described herein.

Embodiment 7

This embodiment of the present invention provides a multi-wavelength PON system, and the multi-wavelength PON includes an optical line terminal OLT and at least one optical network unit ONU. The ONU includes a first port and a second port, and the first port and the second port work on a first wavelength. For a structure of the OLT, refer to description of Embodiment 6; for a structure of the ONU, refer to description of Embodiment 5; and for an interaction procedure between the OLT and the ONU, refer to description of Embodiment 2 or Embodiment 3, and details are not described herein.

Persons of ordinary skill in the art may understand that, each embodiment of the present invention or a possible implementation manner of each aspect may be specifically implemented as a system, a method, or a computer program product. Therefore, each embodiment of the present invention or a possible implementation manner of each aspect may use forms of hardware only embodiments, software only embodiments (including firmware, resident software, and the like), or embodiments with a combination of software and hardware, which are uniformly referred to as "circuit", "module", or "system" herein. In addition, each embodiment of the present invention or the possible implementation manner of each aspect may take a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory (EPROM or flash memory), an optical fiber, and a compact disc read only memory (CD-ROM).

A processor in a computer reads computer-readable program code stored in a computer-readable medium, so that the processor can perform a function and an action specified in each step or a combination of steps in a flowchart; an apparatus is generated to implement a function and an action specified in each block or a combination of blocks in a block diagram.

All computer-readable program code may be executed on a user computer, or some may be executed on a user computer as a standalone software package, or some may be executed on a computer of a user while some is executed on a remote computer, or all the code may be executed on a remote computer or a server. It should also be noted that, in some alternative implementation solutions, each step in the flowcharts or functions specified in each block in the block diagrams may not occur in the illustrated order. For example, two consecutive steps or two blocks in the illustration, which are dependent on an involved function, may actually be executed substantially at the same time, or these blocks may sometimes be executed in reverse order.

Persons of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the present disclosure.

Finally, it should be noted that the foregoing embodiments are merely intended for describing the technical solutions of the present disclosure, but not for limiting the present disclosure. Although the present invention is described in detail with reference to the foregoing embodiments, persons of ordinary skill in the art should understand that they may still make modifications to the technical solutions described in the foregoing embodiments or make equivalent replacements to some or all technical features thereof. Therefore, the protection scope of the present application shall be subject to the protection scope of the claims.

What is claimed is:

1. A communication method performed by a multi-wavelength passive optical network system, wherein the multi-wavelength passive optical network comprises an optical line terminal (OLT) and at least one optical network unit (ONU) comprising at least a first port and a second port, the method comprising:

receiving, by the ONU at the first port or the second port, a wavelength switching request message delivered by the OLT, wherein the wavelength switching request message carries second wavelength channel information and port information that is of the second port;

switching, by the ONU, an operating wavelength channel of an optical module connected to the second port from a first wavelength channel to a second wavelength channel corresponding to the second wavelength channel information; and sending, by the ONU from the first port, a wavelength switching complete message to the OLT.

2. The method according to claim 1, further comprising:
sending, by the ONU from the first port, current state information of the ONU to the OLT, wherein the current state information is sent by the ONU in response to the ONU switching the operating wavelength channel of the optical module connected to the second port from the first wavelength channel to the second wavelength channel.

3. The method according to claim 1, further comprising:
receiving, by the ONU at the first port or the second port, a service handover message sent by the OLT, wherein the service handover message is used to instruct the ONU to switch a service packet receiving port from the first port to the second port, and the service handover message carries second port information.

4. The method according to claim 1, further comprising:
receiving, by the ONU, a service offloading request message delivered by the OLT,
wherein the service offloading request message is used to instruct the ONU to enable the optical module corresponding to the second port to work normally,
wherein the service offloading request message is received by the ONU on the second wavelength channel at the second port or received by the ONU on the first wavelength channel at the first port.

5. The method according to claim 1, wherein the wavelength switching request message carries a start time t0 at which the second port performs wavelength switching.

6. A communication method performed by a multi-wavelength passive optical network, wherein the multi-wavelength passive optical network comprises an optical line terminal (OLT) and at least one optical network unit (ONU) comprising a first port and a second port, the method comprising:

sending, by the OLT, a wavelength switching request message to the ONU, wherein the wavelength switching request message carries second wavelength channel information and port information that is of the second port, and the wavelength switching request message instructs the ONU to switch from a first wavelength channel to a second wavelength channel corresponding to the second wavelength channel information; and receiving, by the OLT, a wavelength switching complete message sent from the first port of the ONU.

7. The method according to claim 6, wherein the method further comprises:
receiving, by the OLT, current state information of the ONU sent from the first port of the ONU.

8. The method according to claim 6, further comprising:
sending, by the OLT, a service handover message to the first port of the ONU, wherein the service handover message is used to instruct the ONU to switch a port for performing service packet interaction between the ONU and the OLT from the first port to the second port, and the service handover message carries second port information.

9. The method according to claim 6, wherein the method further comprises:
sending, by the OLT, a service offloading request message to ONU, the service offloading request message sent by the OLT to the second port using the second wavelength channel or sent by the OLT to the first port using the first wavelength channel, wherein the service offloading request message is used to instruct the ONU to enable an optical module corresponding to the second port to work normally.

10. The method according to claim 6, wherein the wavelength switching request message carries a start time t0 at which the second port performs wavelength switching.

11. An optical network unit (ONU), comprising at least a first port and a second port, wherein:
the first port is configured to:
receive a wavelength switching request message delivered by an optical line terminal (OLT), wherein the wavelength switching request message carries second wavelength channel information and port information that is of the second port, and
send the wavelength switching request message to a processor;
the second port is configured to:
receive the wavelength switching request message delivered by the OLT, wherein the wavelength switching request message carries the second wavelength information and the port information that is of the second port, and
perform a redundancy backup of the ONU; and
the processor connected to the first port and the second port, configured to:
switch an operating wavelength of an optical module corresponding to the second port of the ONU from a first wavelength channel to a second wavelength channel corresponding to the second wavelength channel information, and
generate a wavelength switching complete message and transmit the wavelength switching complete message to the first port, wherein the first port is further configured to send the wavelength switching complete message to the OLT.

12. The ONU according to claim 11, wherein the first port of the ONU is further configured to: send current state information of the ONU to the OLT, based on the second port of the ONU performing wavelength switching.

13. The ONU according to claim 12, wherein the second port of the ONU is further configured to: after receiving the wavelength confirmation instruction, send a wavelength confirmation response message to the OLT using the second wavelength channel.

14. The ONU according to claim 11, wherein the first port of the ONU is further configured to receive a service handover instruction from the OLT, wherein the service handover instruction is used to instruct the ONU to change a service packet receiving port of the ONU from the first port to the second port, and the service handover instruction carries the second port information of the ONU.

15. The ONU according to claim 14, wherein the first port of the ONU is further configured to feed back a service handover confirmation message to the OLT.

16. An optical line terminal (OLT) in a multi-wavelength passive optical network system, wherein the multi-wavelength passive optical network system comprises at least one optical network unit (ONU) comprising a first port and a second port, and the OLT comprises:
a transmitter, configured to send a wavelength switching request message to the ONU, wherein the wavelength switching request message carries second wavelength channel information and port information that is of the second port, and the wavelength switching request message is used to identify a switch of an operating wavelength of an optical module corresponding to the second port of the ONU from a first wavelength channel to a second wavelength channel; and
a receiver, configured to receive, on the first wavelength channel, a wavelength switching complete message sent from the first port of the ONU, wherein the wavelength switching complete message is used to identify that the optical module corresponding to the second port of the ONU completes wavelength switching.

17. The OLT according to claim 16, wherein the receiver is further configured to receive, on the first wavelength channel, current state information of the ONU that is sent from the first port of the ONU.

18. The OLT according to claim 15, further comprising a processor, wherein:
the processor is configured to generate the wavelength switching request message and transmit the wavelength switching request message to the transmitter.

19. The OLT according to claim 16, wherein the transmitter is further configured to send a service offloading request message to the first port of the ONU on the first wavelength channel or to the second port of the ONU on the second wavelength channel, wherein the service offloading request message is used to instruct the ONU to enable the optical module corresponding to the second port to work normally, and the service offloading request message carries port information of the second port.

20. The OLT according to claim 16, wherein the wavelength switching request message carries a start time t0 at which the second port performs wavelength switching.

21. A multi-wavelength passive optical network system, comprising an optical line terminal (OLT) and at least one optical network unit (ONU) comprising at least a first port and a second port, wherein:
the first port and the second port work on a first wavelength;
the first port is configured to:
receive a wavelength switching request message delivered by the OLT, wherein the wavelength switching request message carries second wavelength channel information and port information that is of the second port, and
send the wavelength switching request message to a processor;
the second port is configured to:
receive the wavelength switching request message delivered by the OLT, wherein the wavelength switching request message carries the second wavelength information and the port information that is of the second port, and
perform a redundancy backup of the ONU; and
the processor connected to the first port and the second port, configured to:
switch an operating wavelength of an optical module corresponding to the second port of the ONU from a first wavelength channel to a second wavelength channel corresponding to the second wavelength channel information, and generate a wavelength switching complete message and transmit the wavelength switching complete message to the first port, wherein the first port is further configured to send the wavelength switching complete message to the OLT.

* * * * *

UNITED STATES PATENT AND TRADEMARK OFFICE
CERTIFICATE OF CORRECTION

PATENT NO. : 10,123,101 B2
APPLICATION NO. : 15/639529
DATED : November 6, 2018
INVENTOR(S) : Ye et al.

Page 1 of 1

It is certified that error appears in the above-identified patent and that said Letters Patent is hereby corrected as shown below:

In the Claims

Claim 9, Column 33, Line 7 "to ONU" should read -- to the ONU --.

Signed and Sealed this
First Day of October, 2019

Andrei Iancu
*Director of the United States Patent and Trademark Office*